(12) United States Patent
Kim et al.

(10) Patent No.: US 11,061,533 B2
(45) Date of Patent: Jul. 13, 2021

(54) LARGE FORMAT DISPLAY APPARATUS AND CONTROL METHOD THEREOF

(71) Applicant: SAMSUNG ELECTRONICS CO., LTD., Suwon-si (KR)

(72) Inventors: Hye-sun Kim, Yongin-si (KR); Ju-hee Seo, Suwon-si (KR); Moon-sik Jeong, Seongnam-si (KR); Da-hyun Ryu, Suwon-si (KR); Seong-oh Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 15/018,112

(22) Filed: Feb. 8, 2016

(65) Prior Publication Data

US 2017/0053158 A1    Feb. 23, 2017

Related U.S. Application Data

(60) Provisional application No. 62/206,406, filed on Aug. 18, 2015.

(30) Foreign Application Priority Data

Sep. 2, 2015   (KR) .................. 10-2015-0124510

(51) Int. Cl.
*G06F 3/0482* (2013.01)
*G06F 3/03* (2006.01)
(Continued)

(52) U.S. Cl.
CPC ............ *G06F 3/0482* (2013.01); *G06F 3/011* (2013.01); *G06F 3/0304* (2013.01); *G06Q 30/0276* (2013.01)

(58) Field of Classification Search
CPC ...... G06F 3/0482; G06F 3/011; G06F 3/0304; G06Q 30/0276
See application file for complete search history.

(56) References Cited

U.S. PATENT DOCUMENTS 8,068,676 B2   11/2011   Zhang et al.
8,525,828 B1 *  9/2013   Bates ...................... G06T 15/00
                                                      345/419
(Continued)

FOREIGN PATENT DOCUMENTS

EP   2775456 A2   9/2014
JP   2007-4427 A  1/2007
(Continued)

OTHER PUBLICATIONS

Written Opinion dated May 24, 2016, issued by International Searching Authority in counterpart International Application No. PCT/KR2016/001191 (PCT/ISA/237).
(Continued)

*Primary Examiner* — Lisa S Landis
(74) *Attorney, Agent, or Firm* — Sughrue Mion, PLLC

(57) ABSTRACT

A Large Format Display (LFD) apparatus is provided. The LFD apparatus may include: a display; a sensor configured to recognize a user that is present within a predetermined distance from the display; and a processor configured to acquire profile information of the user recognized through the sensor, determine a model and recommended clothes corresponding to the acquired profile information, and control the display to display the clothing wearing the recommended clothes.

19 Claims, 32 Drawing Sheets

(51) Int. Cl.
*G06F 3/01* (2006.01)
*G06Q 30/02* (2012.01)

(56) References Cited

U.S. PATENT DOCUMENTS

| | | | |
|---|---|---|---|
| 8,799,461 B2 | 8/2014 | Herz et al. | |
| 9,058,058 B2 | 6/2015 | Bell et al. | |
| 9,357,168 B1* | 5/2016 | Leske | H04N 7/152 |
| 2007/0124694 A1 | 5/2007 | Van De Sluis et al. | |
| 2008/0004953 A1 | 1/2008 | Ma et al. | |
| 2010/0080464 A1* | 4/2010 | Sawai | G06F 3/012 |
| | | | 382/190 |
| 2010/0245612 A1* | 9/2010 | Ohashi | H04N 5/23218 |
| | | | 348/222.1 |
| 2010/0265171 A1 | 10/2010 | Pelah | |
| 2011/0154266 A1 | 6/2011 | Friend et al. | |
| 2011/0246329 A1 | 10/2011 | Geisner et al. | |
| 2012/0254986 A1* | 10/2012 | Levien | G06F 21/31 |
| | | | 726/17 |
| 2013/0110666 A1* | 5/2013 | Aubrey | G06Q 30/0269 |
| | | | 705/26.5 |
| 2013/0129210 A1* | 5/2013 | Na | G06Q 30/02 |
| | | | 382/165 |
| 2013/0151382 A1 | 6/2013 | Fuller | |
| 2013/0229482 A1* | 9/2013 | Vilcovsky | G02B 5/08 |
| | | | 348/14.07 |
| 2013/0232034 A1 | 9/2013 | Sano | |
| 2014/0035913 A1* | 2/2014 | Higgins | G06Q 30/00 |
| | | | 345/420 |
| 2014/0168217 A1 | 6/2014 | Kim et al. | |
| 2014/0180864 A1 | 6/2014 | Orlov et al. | |
| 2014/0361987 A1* | 6/2014 | Bickerstaff | |
| 2014/0279197 A1 | 9/2014 | Ainsworth, III et al. | |
| 2014/0310304 A1 | 10/2014 | Bhardwaj et al. | |
| 2015/0077327 A1 | 3/2015 | Pisz et al. | |
| 2015/0081478 A1 | 3/2015 | Bahrami et al. | |
| 2015/0123994 A1* | 5/2015 | Suzuki | G06F 3/017 |
| | | | 345/629 |
| 2015/0186419 A1 | 7/2015 | Agrawal | |
| 2015/0279098 A1* | 10/2015 | Kim | G06T 17/20 |
| | | | 345/420 |
| 2015/0339726 A1* | 11/2015 | Herring | G06Q 30/0261 |
| | | | 705/14.58 |
| 2016/0092956 A1* | 3/2016 | Su | G06Q 30/0643 |
| | | | 705/26.5 |
| 2016/0110595 A1* | 4/2016 | Wang | G06K 9/00375 |
| | | | 705/27.2 |
| 2016/0371536 A1* | 12/2016 | Yamaji | G06K 9/00677 |
| 2017/0004428 A1* | 1/2017 | Desmond | G06Q 10/06311 |

FOREIGN PATENT DOCUMENTS

| | | |
|---|---|---|
| JP | 2009-140032 A | 6/2009 |
| JP | 4686988 B2 | 5/2011 |
| JP | 5581348 B2 | 8/2014 |
| KR | 10-2003-0083453 A | 10/2003 |
| KR | 10-2006-0016611 A | 2/2006 |
| KR | 10-2006-0091310 A | 8/2006 |
| KR | 10-2007-0010702 A | 1/2007 |
| KR | 10-0859502 B1 | 9/2008 |
| KR | 10-2010-0048733 A | 5/2010 |
| KR | 10-2011-0083831 A | 7/2011 |
| KR | 10-2012-0040565 A | 4/2012 |
| KR | 10-1141087 B1 | 7/2012 |
| KR | 10-1268640 B1 | 6/2013 |
| KR | 10-2014-0124087 A | 10/2014 |
| KR | 10-2014-0130767 A | 11/2014 |
| KR | 10-2015-0090353 A | 8/2015 |
| WO | 2008/108760 A1 | 9/2008 |
| WO | 2009/090391 A1 | 7/2009 |
| WO | 2013/147003 A1 | 10/2013 |

OTHER PUBLICATIONS

International Search Report dated May 24, 2016, issued by International Searching Authority in corresponding International Application No. PCT/KR2016/001191 (PCT/ISA/210).
Communication dated May 23, 2018, issued by the European Patent Office in counterpart European Patent Application No. 16837199.5.
Communication dated Nov. 19, 2019, issued by the Korean Intellectual Property Office in counterpart Korean Application No. 10-2015-0124510.
YouTube "FXMirror_3D Virtual Fitting Solution" retrieved from [ <URL: https//www.youtube.com/watch?v=nWcGhuX6N7w> ] Feb. 3, 2015 (1 page total).
Communication dated May 26, 2020, issued by the Korean Intellectual Property Office in Korean Application No. 10-2015-0124510.

* cited by examiner

LARGE FORMAT DISPLAY APPARATUS AND CONTROL METHOD THEREOF

CROSS-REFERENCE TO RELATED APPLICATIONS

This application claims priority from U.S. Provisional Application No. 62/206,406, filed on Aug. 18, 2015, in the United States Patent and Trademark Office, and Korean Patent Application No. 10-2015-0124510, filed on Sep. 2, 2015, in the Korean Intellectual Property Office, the disclosures of which are incorporated herein by reference in their entireties.

BACKGROUND

Field

Apparatuses and methods consistent with exemplary embodiments relate to a Large Format Display (LFD) apparatus and a control method thereof, and more particularly, to an LFD apparatus which provides a variety of information and a user interaction using a large display, and a control method thereof.

Description of the Related Art

Due to the development of electronic technology, various kinds of electronic products are developing and are being widely used, and electronic devices provided with various information providing functions are being used. Furthermore, the electronic devices used only in indoor spaces are installed and used outdoors.

From among these electronic devices, an LFD apparatus is a commercial large size display which is installed and operated for the purpose of promoting products and delivering information. The LFD apparatus may be a standalone apparatus including a single panel, or a video wall which has a plurality of panels connected with one another. In addition, the LFD apparatus may be installed in a lobby of a company to promote brands and business of the company, or may be used for various purposes such as an interior of a store, a menu board, etc. In recent years, as the LFD apparatus is increasingly used, various problems arise.

FIG. 1 is a view to illustrate a problem of a related-art apparatus.

The related-art LFD apparatus displays a pre-stored content in a predetermined method, and thus has difficulty in adaptively providing contents according to a user and an environment. For example, when the LFD apparatus displays a toy advertisement, the LFD apparatus continues displaying only the toy advertisement even when an adult is in front of the LFD apparatus. That is, the viewer has no opportunity to change the content provided by the LFD apparatus or view the content again.

In addition, as the LFD apparatuses are installed in many places, there are problems that a viewer's interest diminishes and an advertising effect is reduced.

These problems of the related-art apparatus arise from the contents being provided by the LFD apparatus in a fixed method. Therefore, there is a need for an LFD apparatus which can arouse more interest of a viewer.

SUMMARY

Exemplary embodiments address at least the above disadvantages and other disadvantages not described above. Also, the exemplary embodiments are not required to overcome the disadvantages described above, and may not overcome any of the problems described above.

One or more exemplary embodiments provide an LFD apparatus which acquires profile information on a user who uses the LFD apparatus, and determines a model and recommended clothes to be displayed on the LFD apparatus, and displays the model and the recommended clothes and a control method thereof.

According to an aspect of an exemplary embodiment, there is provided a display apparatus including: a display; a sensor configured to recognize a user that is present within a predetermined distance from the display; and a processor configured to acquire profile information of the user recognized through the sensor, determine a model and recommended clothes corresponding to the acquired profile information, and control the display to display the model wearing the recommended clothes.

The sensor may be configured to recognize a motion of the user, and the processor may be configured to control a motion state of the model based on the recognized motion of the user.

The processor may be configured to display a background image which is distinguished from the model, and, in response to a user's motion of moving in a horizontal direction while keeping a perpendicular distance from the display apparatus being recognized, the processor may be configured to change the background image based on a moving direction of the user, and, in response to a user's motion of changing the perpendicular distance from the display apparatus being recognized, the processor may be configured to maintain the background image.

The processor may be configured to determine the model based on age and sex information of the user, and determine the recommended clothes based on information on clothes that the user is wearing.

The processor may be configured to determine recommended accessories based on at least one of a record of purchase of clothes of the user, and a record of purchase of accessories, and display the model wearing the recommended accessories.

In response to a distance between the display and the user being within a predetermined distance, the processor may be configured to generate a query that inquires about a type of clothes that the user wants to wear, and determine the recommended clothes based on a response of the user to the query.

The processor may be configured to acquire at least one of a sex, an age, a clothing attribute, a skin tone, a body type, and a fashion image of the user as the profile information of the user, and determine the recommended clothes based on the acquired profile information and the response to the query.

In response to a predetermined operation being recognized from the user, the processor may be configured to control the model to make a gesture to react to the predetermined operation, and display an animation effect corresponding to the predetermined operation.

The processor may be configured to determine the user as a main user from among a plurality of users recognized through the sensor, based on at least one of a record of visit, a record of purchase, a degree of interest in the LFD apparatus, a distance from the display, and a distance from a center of the display of the plurality of users.

The processor may be configured to measure the degree of interest in the LFD apparatus based on at least one of a respective face direction of the plurality of users and a respective time duration during which the plurality of users is staring at the display.

According to an aspect of another exemplary embodiment, there is provided a control method of a display apparatus including: recognizing a user that is present within a predetermined distance from the display apparatus; acquiring profile information of the recognized user; determining a model and recommended clothes corresponding to the acquired profile information; and displaying the model wearing the recommended clothes.

The recognizing may include recognizing a motion of the user, and the displaying may include controlling a motion of the model based on the recognized motion of the user.

The displaying may include displaying a background image which is distinguished from the model, and, in response to a user's motion of moving in a horizontal direction while keeping a perpendicular distance from the display apparatus being recognized, changing the background image based on a moving direction of the user, and, in response to a user's motion of changing the perpendicular distance from the display apparatus being recognized, maintaining the background image.

The determining may include determining the model based on age and sex information of the user, and determining the recommended clothes based on information on clothes that the user is wearing.

The determining may include determining recommended accessories based on at least one of a record of purchase of clothes of the user, and a record of purchase of accessories, and the displaying may include displaying the model wearing the recommended accessories.

The control method may further include, in response to a distance between the display and the user being within a predetermined distance, generating a query that inquires about a type of clothes that the user wants to wear, and the determining may include determining the recommended clothes based on a response of the user to the query.

The acquiring may include acquiring at least one of a sex, an age, a clothing attribute, a skin tone, a body type, and a fashion image of the user as the profile information of the user, and the determining may include determining the recommended clothes based on the acquired profile information and the user's response.

The displaying may include, in response to a predetermined operation being recognized from the user, controlling the model to make a gesture to react to the predetermined operation, and displaying an animation effect corresponding to the predetermined operation.

The control method may further include, in response to a plurality of users being recognized, determining the user as a main user from among a plurality of users recognized through the display apparatus, based on at least one of a record of visit, a record of purchase, a degree of interest in the LFD apparatus, a distance from the display, and a distance from a center of the display of the plurality of users.

The determining the user as the main user may include measuring the degree of interest in the display apparatus based on at least one of a respective face direction of the plurality of users and a respective time duration during which the plurality of users is staring at the display.

According to an aspect of another exemplary embodiment, there is provided a display apparatus including: a display; a sensor configured to recognize that a person is present within a predetermined distance from the display and capture an image of the person; and a processor configured to extract facial features and a body size of the person from the captured image, generate a virtual model based on the extracted facial features and the body size, and determine recommend clothes to be worn by the virtual model based on profile information of the person.

The profile information may include at least one of a sex, an age, and a purchase record of clothes associated with the person.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
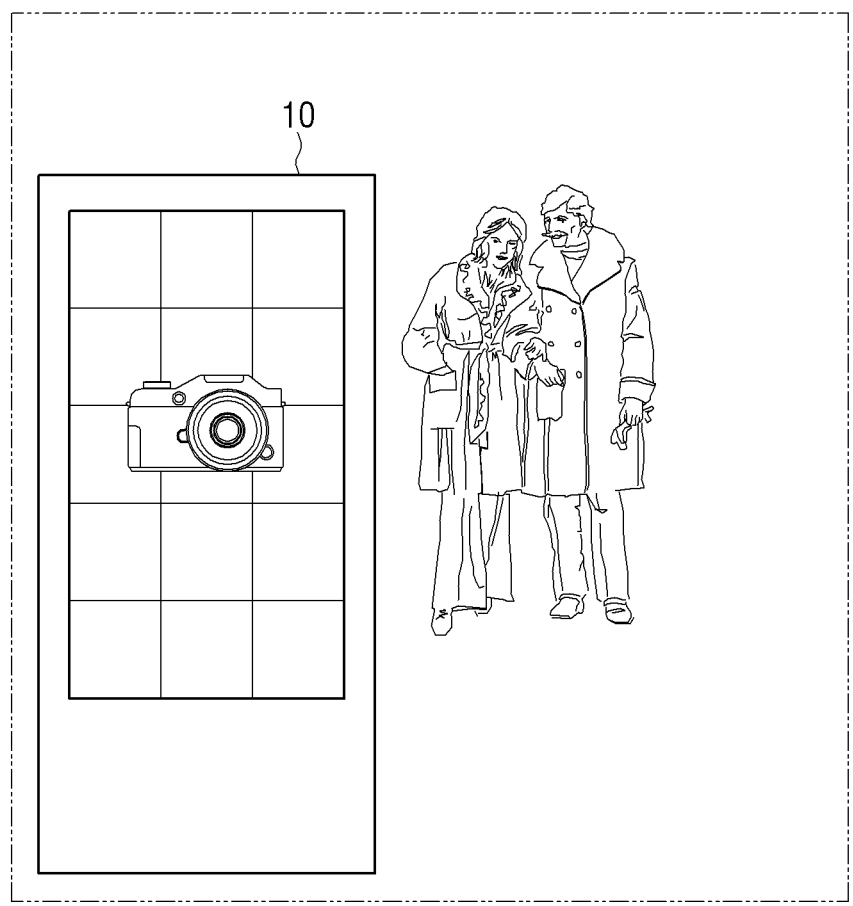
FIG. 1 is a view to illustrate a problem of a related-art apparatus.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the disclosure with unnecessary detail.

Figure 2A:
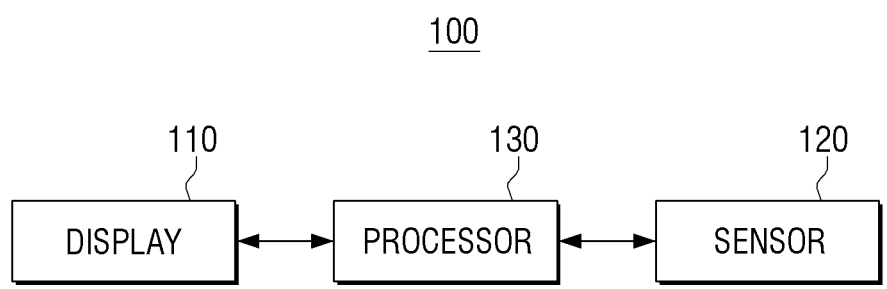
FIGS. 2A and 2B are block diagrams showing a configuration of an LFD apparatus according to an exemplary embodiment.
Figure 2B:
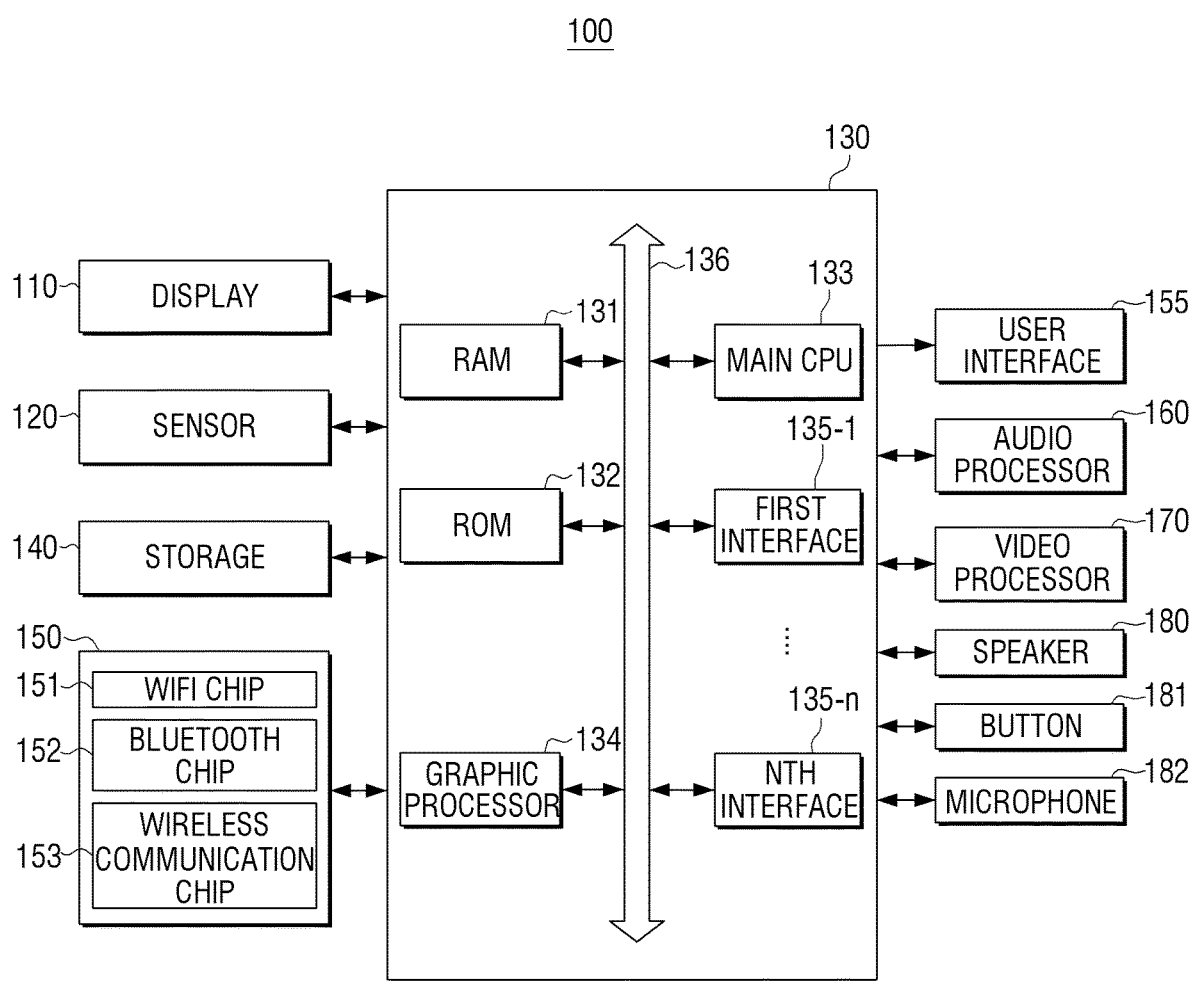

FIGS. 2A and 2B are block diagrams showing a configuration of an LFD apparatus 100 according to an exemplary embodiment.

Referring to FIG. 2A, the LFD apparatus 100 includes a display 110, a sensor 120, and a processor 130.

In FIG. 2A, the LFD apparatus 100 is provided with various functions such as a display function, a sensing function, a control function, etc., and overall elements of the LFD apparatus 100 are illustrated. According to an exemplary embodiment, some of the elements shown in FIG. 2A may be omitted or changed, and other elements may further be added.

The display 110 may display a clothing model and recommended clothes under control of the processor 130. For example, the display 110 may display a clothing model who wears recommended clothes. However, this should not be considered as limiting, and the display 110 may display only the recommended clothes. In addition, the display 110 may display accessories, fashion items, etc. in addition to the clothes.

In addition, the display 110 may be implemented by using a Liquid Crystal Display (LCD) panel, Organic Light Emitting Diodes (OLEDs), etc. However, this should not be considered as limiting. The display 110 may be implemented by using a flexible display, a transparent display, etc. according to an exemplary embodiment.

The sensor 120 may recognize a user (or person) who is located in front of the LFD apparatus 100. Herein, the sensor 120 may identify a sex, an age, and a relationship between users based on characteristics such as user's face and body, clothes, gait, pose, etc. In addition, the sensor 120 may recognize a user's face and identify the user from a pre-stored face image. In addition, the sensor 120 may detect a user's motion.

The sensor 120 may include a camera. The camera is configured to photograph a still image or a moving image. In particular, the camera may be used to photograph a user located in front of the LFD apparatus 100. However, this should not be considered as limiting, and the sensor 120 may include Kinect, a depth camera, an ultrasonic sensor, etc.

The sensor 120 may acquire profile information of the user by communicating with an electronic device carried by the user. In this case, the LFD apparatus 100 may communicate with the electronic device carried by the user using WiFi, Near Field Communication, etc.

The processor 130 may acquire the profile information of the user who is recognized through the sensor 120, determine a clothing model and recommended clothes corresponding to the acquired profile information, and control the display 110 to display the clothing model wearing the recommended clothes. The processor 130 may allow a user to select one of a plurality of virtual clothing models stored in LFD apparatus 100. The plurality of clothing models may be divided into male models and female models. The male models may be divided into a young adult model, a middle-aged model, etc. Alternatively, the LFD apparatus 100 may capture an image of the user standing in front of the display 110, and the processor 130 may perform a three-dimensional image rendering to generate a virtual clothing model based on the captured image of the user so that the virtual clothing model resembles the user. The processor 130 may extract facial features and body sizes of the user from the captured image to generate the virtual clothing model. Further, the processor 130 may use body measurements (e.g., a height, a weight, etc.) of the user which are stored in an external device (e.g., cloud database, a smartphone of the user, etc.) and received from the external device via wireless communication.

In addition, the processor 130 may control the motion state of the clothing model such that the clothing model corresponds to a user's motion recognized through the sensor 120. Herein, the processor 130 may change the recommended clothes that the clothing model wears to correspond to the motion state of the clothing model, in addition to the clothing model, and display the clothes.

In addition, the processor 130 may display a background image which is distinguished from the clothing model. In response to a user's motion of moving in the horizontal direction while keeping a perpendicular distance from the LFD apparatus 100 being recognized, the processor 130 may change the background image based on a moving direction of the user, and, in response to a user's motion of changing the perpendicular distance from the LFD apparatus 100 being recognized, the processor 130 may maintain the background image. In this case, the processor 130 may change the clothing model and the background image differently even in response to the same user's motion being recognized.

In addition, the processor 130 may determine the clothing model based on user's age and sex information, and determine the recommended clothes based on information on clothes that the user wears.

In addition, the processor 130 may determine recommended accessories based on at least one of a user's record of having purchased clothes and a record of having purchased accessories, and may display the clothing model wearing the recommended accessories.

In addition, in response to a distance between the display 110 and the user being within a predetermined distance, the processor 130 may provide a query for receiving a kind of clothes desired by the user, and determine recommended clothes based on a user's response to the query.

In addition, the processor 130 may acquire at least one of user's sex, age, clothing attribute, skin tone, body type, and fashion image as the profile information of the user, and determine recommended clothes based on the acquired profile information and the user's response.

In addition, in response to a predetermined operation being recognized from the user, the processor 130 may control the clothing model to make a gesture to react to the predetermined operation, or may display an animation effect corresponding to the predetermined operation. For example, the processor 130 may synchronize the user's motion with the clothing model's motion.

In addition, in response to a plurality of users being recognized through the sensor 120, the processor 130 may determine a main user from among the plurality of users based on at least one of a record of visit of the plurality of users, a record of purchase, a degree of interest in the LFD apparatus 100, a distance from the display 110, and a distance from the center of the display 110, and display a clothing model corresponding to the main user.

In addition, the processor 130 may measure the degree of interest in the LFD apparatus 100 based on at least one of a user's face direction and a time during which the user is staring at the display 110. The LFD apparatus 100 may include a light source and a camera. The light source may radiate light towards the user's eye and the camera may track light reflected off the user's pupil. The processor 130 may obtain data from the reflection of the light, including the rotation of the eye and the direction of gaze.

FIG. 2B is a block diagram showing a detailed configuration of an LFD apparatus 100. Referring to FIG. 2B, the LFD apparatus 100 may include a display 110, a sensor 120, a processor 130, a storage 140, a communicator 150, a user interface 155, an audio processor 160, a video processor 170, a speaker 180, a button 181, and a microphone 182.

From among the elements shown in FIG. 2B, the same elements as in FIG. 2A will not be described in detail.

The processor 130 controls overall operations of the LFD apparatus 100 using various programs stored in the storage 140.

Specifically, the processor 130 may include a Random Access Memory (RAM) 131, a Read Only Memory (ROM) 132, a main Central Processing Unit (CPU) 133, a graphic processor 134, first to n-th interfaces 135-1 to 135-n, and a bus 136.

The RAM 131, the ROM 132, the main CPU 133, the graphic processor 134, and the first to n-th interfaces 135-1 to 135-n may be connected with one another via the bus 136.

The first to n-th interfaces 135-1 to 135-n may be connected with the above-described various elements. One of the interfaces may be a network interface which is connected with an external device via a network.

The main CPU 133 may access the storage 140 and perform booting using the operating system (O/S) stored in the storage 140. In addition, the main CPU 133 may perform various operations using various programs, etc. which are stored in the storage 140.

The ROM 132 may store a set of instructions for booting a system. In response to a turn on command being inputted and power being supplied, the main CPU 133 may copy the O/S stored in the storage 140 into the RAM 131 according to a command stored in the ROM 132, and boot the system by executing the O/S. In response to the booting being completed, the main CPU 133 may copy various application programs stored in the storage 140 into the RAM 131, and perform various operations by executing the application programs copied into the RAM 131.

The graphic processor 134 may generate a screen including various objects such as an icon, an image, a text, etc. using a calculator and a renderer. The calculator may calculate attribute values of objects to be displayed according to a layout of the screen, such as a coordinate value, a shape, a size, a color, etc., based on a received control command. The renderer may generate a screen of various layouts including objects based on the attribute values calculated by the calculator. The screen generated in the renderer is displayed within a display area of the display 110.

The above-described operations of the processor 130 may be performed by a program stored in the storage 140.

The storage 140 may store various data such as an O/S software module for driving the LFD apparatus 100, clothing model information, clothing information, accessories information, and information on a user's record of purchase, etc.

In this case, the processor 130 may display a clothing model and recommended clothes based on the information stored in the storage 140.

The communicator 150 may communicate with an external device according to various kinds of communication methods.

The communicator 150 may include various communication chips such as a WiFi chip 151, a Bluetooth chip 152, a wireless communication chip 153, etc. The WiFi chip 151 and the Bluetooth chip 152 may communicate in the WiFi method and the Bluetooth method, respectively. The wireless communication chip 153 refers to a chip which performs communication according to various communication standards such as IEEE, Zigbee, Generation (3G), $3^{rd}$ Generation Partnership Project (3GPP), Long Term Evolution (LTE), etc.

The communicator 150 may perform unidirectional communication or bidirectional communication with an electronic device. When the communicator 150 performs the unidirectional communication, the communicator 150 may receive signals from the electronic device. When the communicator 150 performs the bidirectional communication, the communicator 150 may receive signals from the electronic device or transmit signals to the electronic device.

The user interface 155 may receive various user interactions. The user interface 155 may be implemented in various forms according to an implementation example of the LFD apparatus 100. When the LFD apparatus 100 is implemented by using a digital TV, the user interface 155 may be implemented by using a remote control receiver for receiving a remote control signal from a remote control device, a camera for sensing a user motion, a microphone for receiving a user voice, etc. In addition, when the LFD apparatus 100 is implemented by using a touch-based electronic device, the user interface 155 may be implemented in the form of a touch screen forming a mutual layer structure with a touch pad. In this case, the user interface 155 may be used as the above-described display 110.

The audio processor 160 is an element for processing audio data. The audio processor 160 may perform various processing operations such as decoding, amplification, noise filtering, etc. with respect to the audio data.

The video processor 170 is an element for processing video data. The video processor 170 may perform various image processing operations such as decoding, scaling, noise filtering, frame rate conversion, resolution conversion, etc. with respect to the video data.

The speaker 180 is an element for outputting not only various audio data processed by the audio processor 160 but also various notification sounds, voice messages, etc.

The button 181 may include various types of buttons such as a mechanical button, a touch pad, a wheel, etc. formed on a certain area of the LFD apparatus 100, such as a front surface, a side surface, and a rear surface of the body exterior of the LFD apparatus 100.

The microphone 182 is an element for receiving an input of a user voice or other sounds and converting the user voice or sound into audio data.

Hereinafter, a basic configuration and various exemplary embodiments will be explained for easy understanding of the present disclosure.

Figure 3:
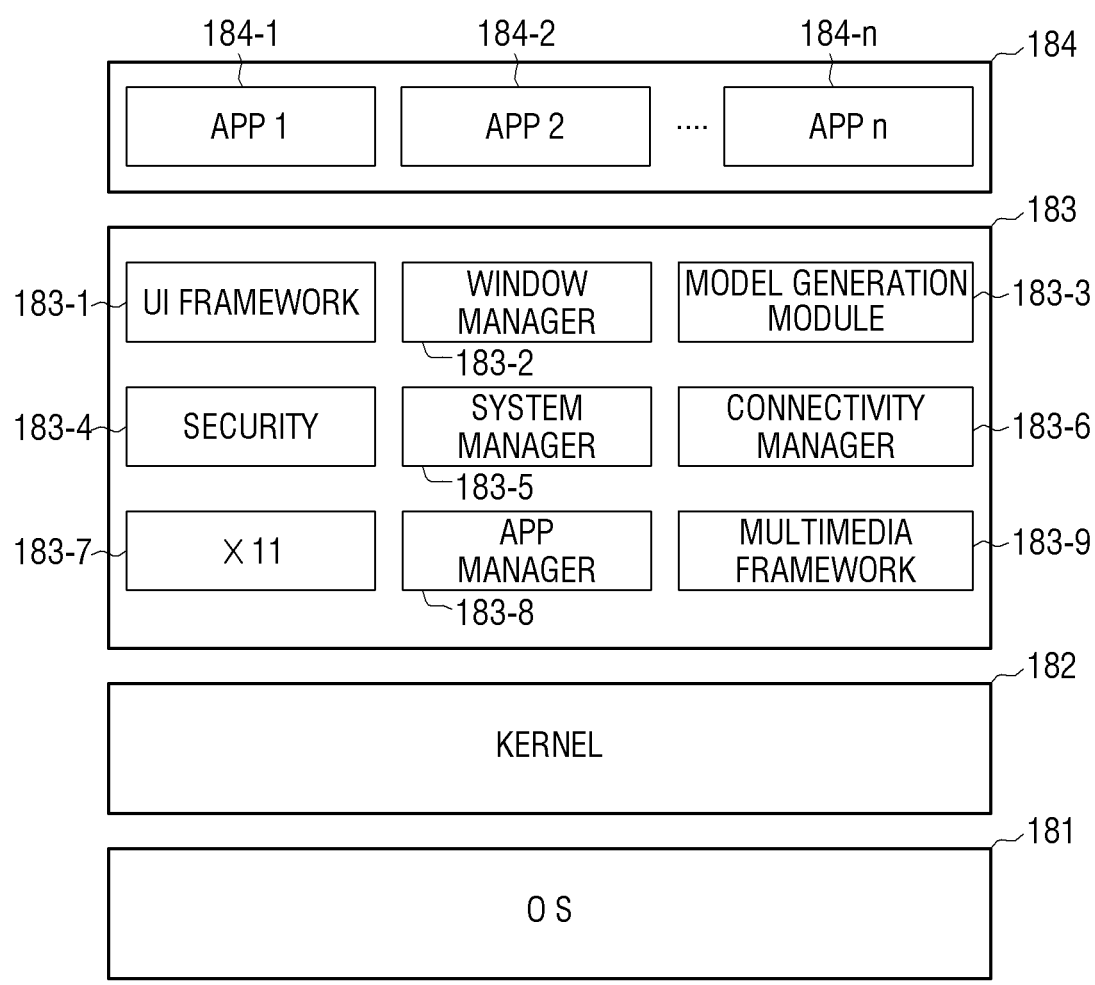
FIG. 3 is a block diagram showing a software structure used in an LFD apparatus according to an exemplary embodiment.

FIG. 3 is a block diagram showing a software structure which is used in the LFD apparatus 100 according to an exemplary embodiment.

The software of FIG. 3 may be stored in the storage 140, but is not limited to this. The software may be stored in various kinds of storing means used in the LFD apparatus 100. Referring to FIG. 3, software including an OS 181, a kernel 182, middleware 183, an application 184, and the like may be stored in the LFD apparatus 100.

The OS 181 controls and manages the overall operations of hardware. That is, the OS 181 is a layer which is responsible for basic functions such as hardware management, memory, and security.

The kernel 182 serves as a channel to transmit detected various signals to the middleware 183.

The middleware 183 includes various software modules to control the operations of the LFD apparatus 100. Referring to FIG. 3, the middleware 183 includes a user interface (UI) framework 183-1, a window manager 183-2, a model generation module 183-3, a security module 183-4, a system manager 183-5, a connectivity manager 183-6, an X11 module 183-7, an APP (application) manager 183-8, and a multimedia framework 183-9.

The UI framework 183-1 is a module which provides various UIs. The UI framework 183-1 may include an image compositor module to configure various objects, a coordinates compositor module to calculate coordinates for displaying the objects, a rendering module to render the configured objects on the calculated coordinates, a two-dimensional/three-dimensional (2D/3D) UI toolkit to provide a tool for configuring a UI in the form of 2D or 3D.

The window manager 183-2 may detect a control signal which is transmitted from a remote control device, a user touch input on the display 110, and various input events such as manipulation of a button provided on the LFD apparatus 100. In response to such an event being detected, the window manager 183-2 transmits an event signal to the UI framework 183-1 such that an operation corresponding to the event is performed. Specifically, in response to an event in which the user touches a certain area of the display 110 occurring, the UI framework 183-1 notifies the event. The UI framework 183-1 may display clothes which are selected based on a user's touch area.

The model generation module 183-3 may determine a clothing model and recommended clothes based on user's profile information as described above. In addition, the model generation module 183-3 may determine recommended accessories based on a user's record of purchase.

The security module 183-4 is a module which supports certification, permission, and secure storage for hardware.

The system manager 183-5 monitors the states of the elements in the LFD apparatus 100, and provides the result of the monitoring to the other modules. For example, in response to a battery life level being low, an error being generated, or communication being disconnected, the system manager 183-5 provides the result of the monitoring to the UI framework 183-1 to output a notification message or a notification sound.

The connectivity manager 183-6 is a module which supports wire or wireless network connection. The connectivity manager 183-6 may include various sub modules such as a DNET module, a Universal Plug and Play (UPnP) module, and the like.

The X11 module 183-7 is a module which receives various event signals from a variety of hardware provided in the LFD apparatus 100. The event recited herein refers to an event in which a user operation is detected, an event in which a system alarm is generated, an event in which a specific program is executed or ends, or the like.

The APP manager 183-8 is a module which manages the execution states of various applications installed in the storage 140. In response to an event in which an application execution command is inputted being detected by the X11 module 183-7, the APP manager 183-8 may call and execute an application corresponding to the event. That is, in response to an event in which at least one object is selected being detected, the APP manager 183-8 may call an application corresponding to the object and execute the application.

The multimedia framework 183-9 is a module which reproduces multimedia contents which are stored in the LFD apparatus 100 or provided from external sources. The multimedia framework 183-9 may include a player module, a camcorder module, a sound processing module, and the like. Accordingly, the multimedia framework 183-9 may reproduce various multimedia contents, generate a screen and a sound, and reproduce the same.

The software structure shown in FIG. 3 is merely an example and is not limited to this. Therefore, some of the elements may be omitted or changed or an element may be added when necessary. For example, the storage 140 may be additionally provided with various programs such as a sensing module to analyze signals sensed by various sensors, a messaging module such as a messenger program, a Short Message Service (SMS) & Multimedia Message Service (MMS) program, and an email program, a call information aggregator program module, a VoIP module, a web browser module, and the like.

Figure 4A:
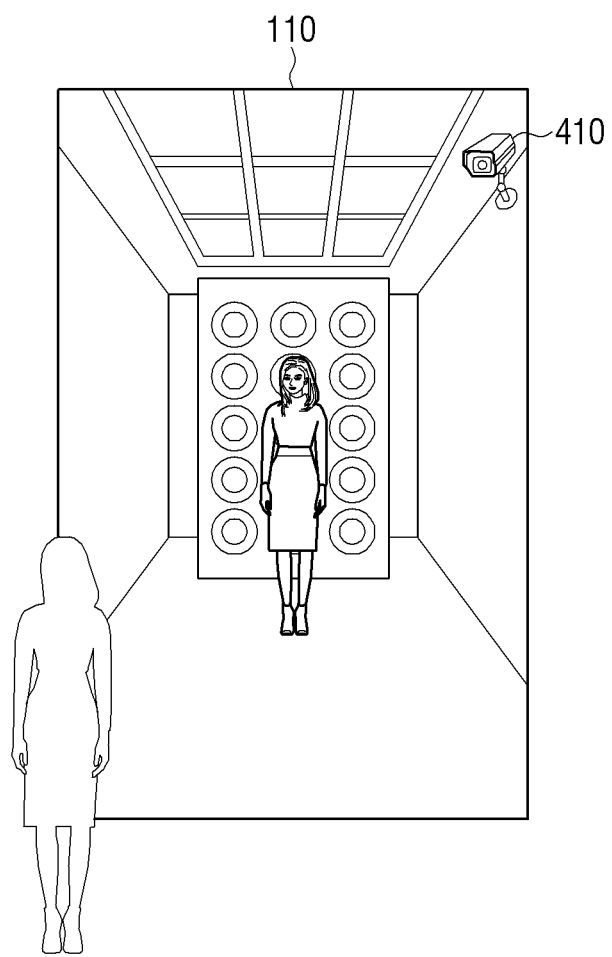
FIGS. 4A and 4B are views to illustrate a method for acquiring profile information of a user according to an exemplary embodiment.
Figure 4B:
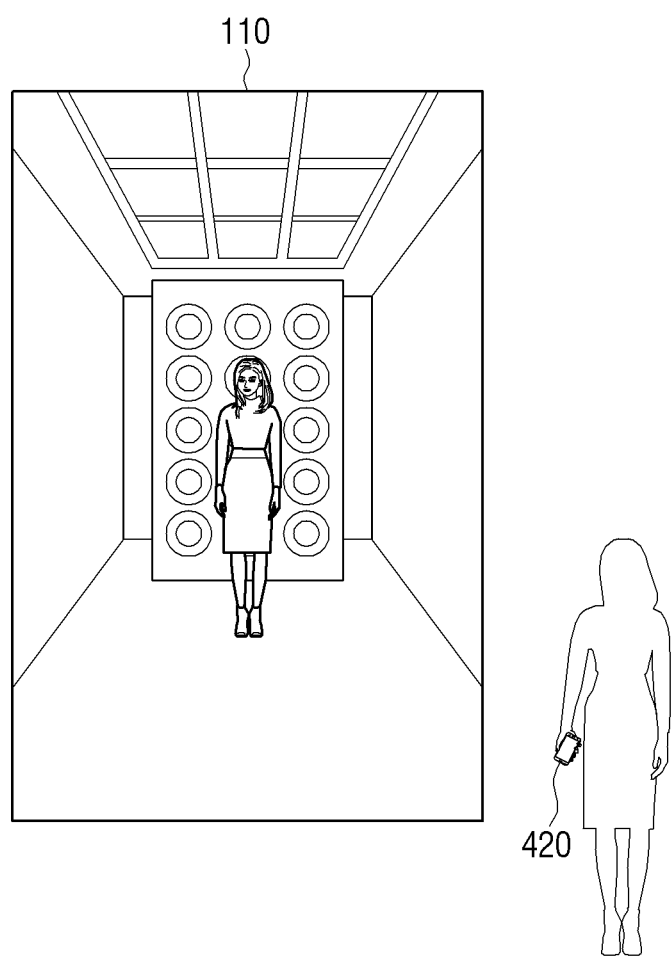

FIGS. 4A and 4B are views to illustrate a method for acquiring user's profile information according to an exemplary embodiment.

Referring to FIG. 4A, the processor 130 may acquire profile information of a user who is recognized through the sensor 120 including a camera 410. For example, the processor 130 may recognize a user's face from an image photographed by the camera 410, and acquire the profile information of the user based on stored information. However, this should not be considered as limiting. When the user's face image does not match the stored information, the processor 130 may analyze the face image and extract information on an age, a sex, etc. In addition, the processor 130 may acquire information on clothes that the user is wearing through a whole body image in addition to the user's face.

Referring to FIG. 4B, the processor 130 may acquire the user's profile information through an electronic device 420 which is carried by the user. In response to the user entering within a predetermined distance from the LFD apparatus 100, the processor 130 may communicate with the electronic device 420 carried by the user through wireless communication such as near field communication (NFC), Bluetooth, Beacon, etc. In addition, the processor 130 may receive the user's profile information from the electronic device 420 carried by the user. In addition, the processor 130 may acquire the user's profile information based on Customer Relationship Management (CRM) information, which is generated by receiving minimum information (for example, a name, a mobile phone number, a user ID, etc.) which can identify the user from the electronic device 420 carried by the user, and storing the information.

In the above-described examples, the method of using the camera 410 and the method of communicating with the electronic device 420 are performed separately, but these methods may be performed simultaneously. For example, the processor 130 may receive the user's age, sex, etc. from the electronic device 420, and may acquire the information of the clothes that the user is wearing using the camera 410.

In addition, the processor 130 may acquire the user's profile information using Kinect, a depth camera, an ultrasonic sensor, etc. in addition to the camera 410.

Figure 5A:
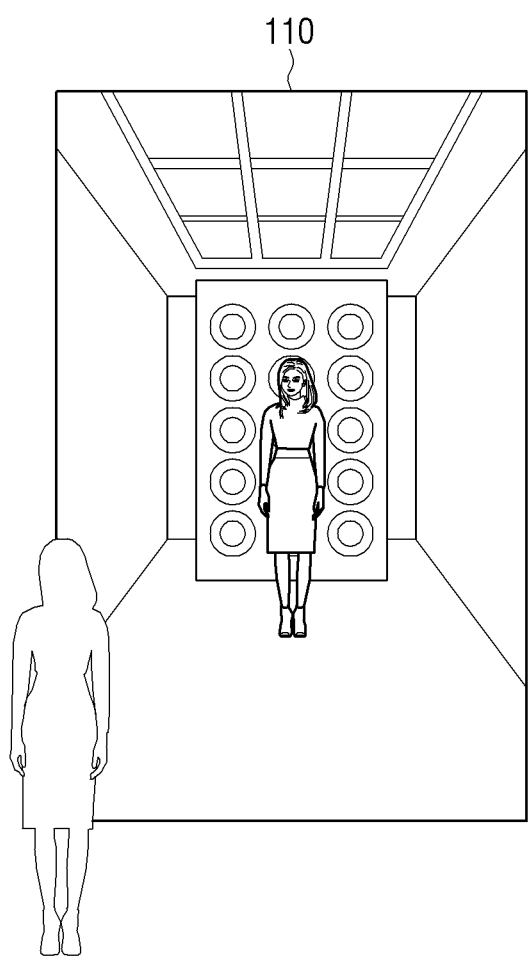
FIGS. 5A and 5B are views to illustrate a method for displaying a clothing model and recommended clothes according to an exemplary embodiment.
Figure 5B:
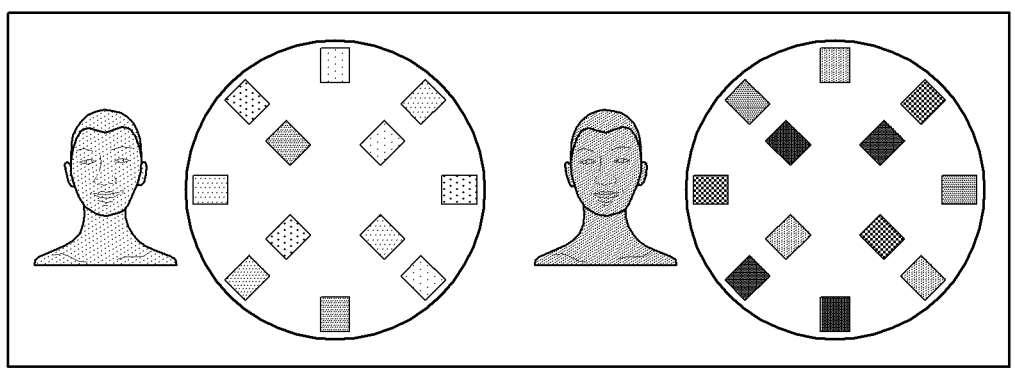

FIGS. 5A and 5B are views to illustrate a method for displaying a clothing model and recommended clothes according to an exemplary embodiment.

Referring to FIG. 5A, the processor 130 may determine a clothing model corresponding to acquired profile information. In particular, the processor 130 may determine a clothing model based on user's age and sex information. For example, in response to the processor 130 acquiring profile information indicating that the user is a woman in her twenties, the processor 130 may determine a female clothing model in her twenties. However, this should not be considered as limiting. The processor 130 may determine a clothing model based on a user's record of purchase rather than the user's age and sex information. For example, when the user is a woman in her twenties, but has the record of having frequently purchased clothes for men in their twenties, the processor 130 may determine a male clothing model in his twenties.

The processor 130 may determine recommended clothes corresponding to the acquired profile information. In particular, the processor 130 may determine the recommended clothes based on information on clothes that the user is wearing. For example, the processor 130 may acquire a black dress that the user is wearing as profile information, and determine a similar dress to the black dress as recommended clothes. That is, the processor 130 may acquire the type, fashion image, color, and pattern of the clothes that the user is wearing, and determine the recommended clothes. However, this should not be considered as limiting. The processor 130 may determine trendy clothes as the recommended clothes regardless of the clothes that the user is wearing.

In the above-described example, only the dress has been described. However, the same can be applied to different kinds of clothes, such as a classic suit or sporty knitwear. In addition, the processor 130 may determine clothes related to the clothes that the user is wearing as the recommended clothes. For example, in response to the user wearing a classic suit, the processor 130 may determine a shirt as recommended clothes. In addition, the processor 130 may additionally display dress shoes as well as the shirt.

Referring to FIG. 5B, the processor 130 may determine the color of clothes by considering a user's skin tone. For example, in response to the user's skin tone being bright, the processor 130 may determine clothes of bright color as the recommended clothes. In addition, in response to the user's skin tone being dark, the processor 130 may determine clothes of dark color as the recommended clothes. However, this should not be considered as limiting. The processor 130 may determine clothes of opposite color to the user's skin tone as the recommended clothes. The matching information between the user's skin tone and the color of clothes may be stored in the storage 140.

Referring back to FIG. 5A, the processor 130 may display the clothing model wearing the recommended clothes. For example, the processor 130 may display the clothing model in her twenties wearing a dress. However, this should not be considered as limiting, and the processor 130 may display the clothing model and the recommended clothes separately.

In response to user's eyes not being on the display 110 for more than a predetermined time, the processor 130 may change at least one of the clothing model and the recommended clothes. For example, in response to the user not seeing the display 110 for more than 20 seconds, the processor 130 may change the recommended clothes from clothes for women in their twenties to clothes for teenage girls. However, this should not be considered as limiting. The processor 130 may change casual wear to formal wear or may change the clothing model to a male model. In addition, the processor 130 may change at least one of the clothing model and the recommended clothes based on a touch input, etc. rather than based on the direction of the user's eyes.

Figure 6A:
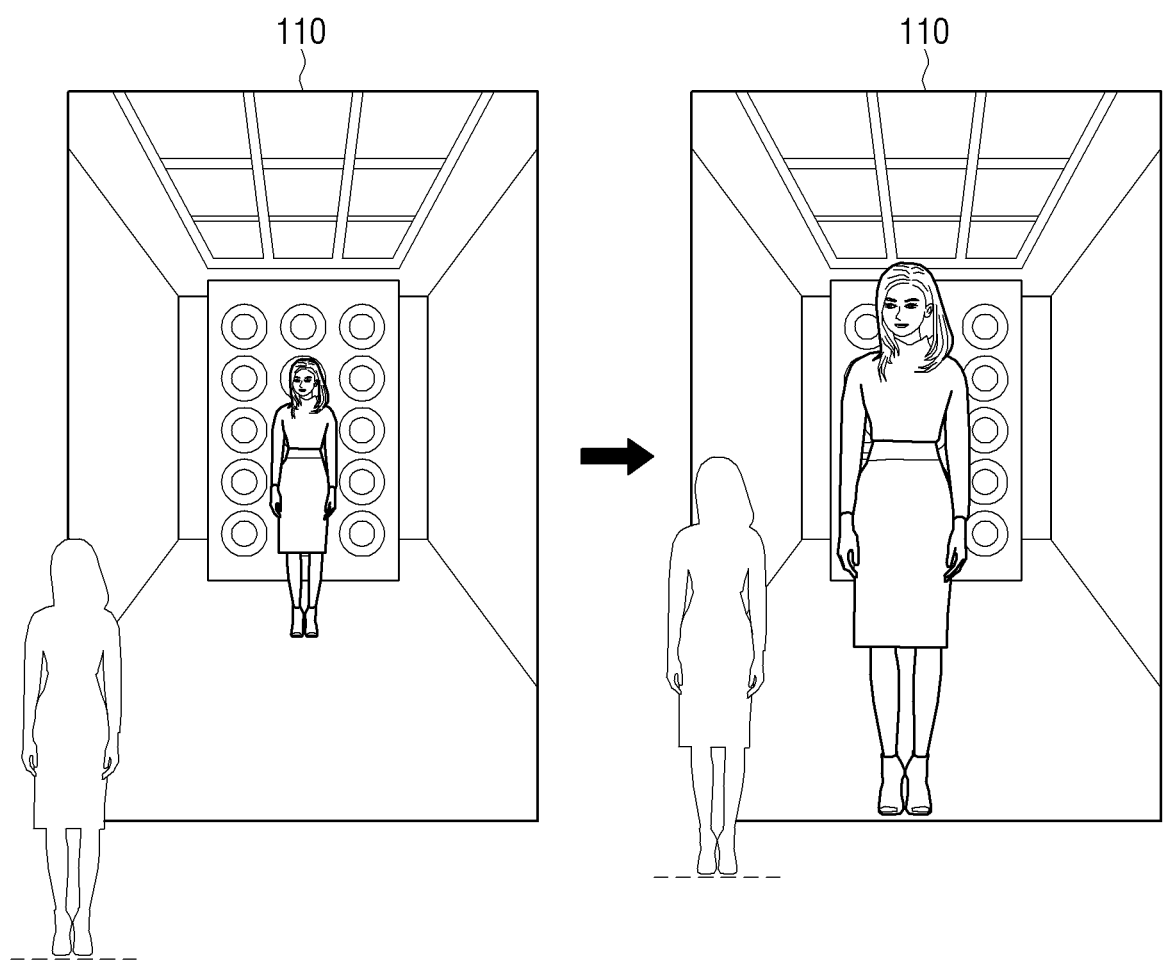
FIGS. 6A to 6C are views to illustrate a display state corresponding to a user's motion according to an exemplary embodiment.
Figure 6B:
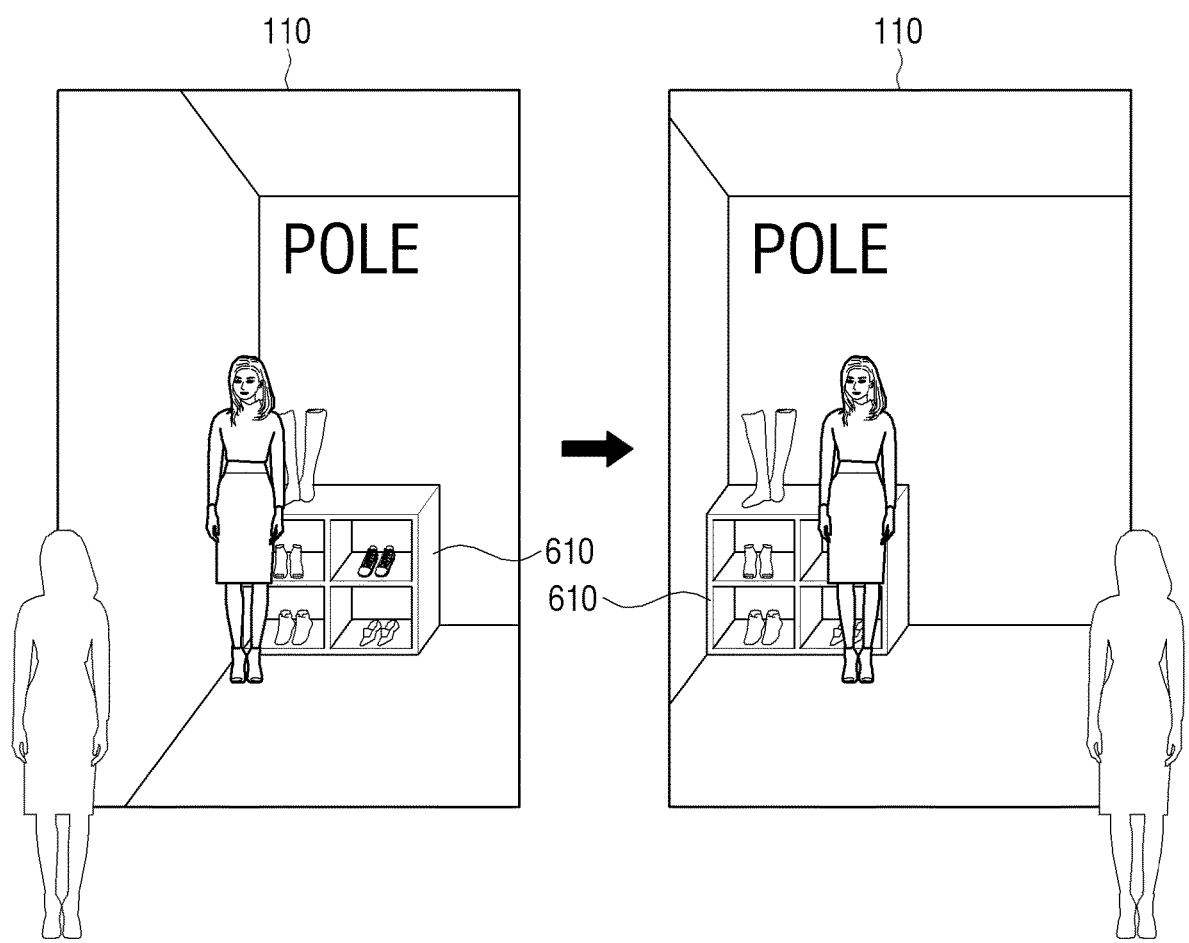
Figure 6C:
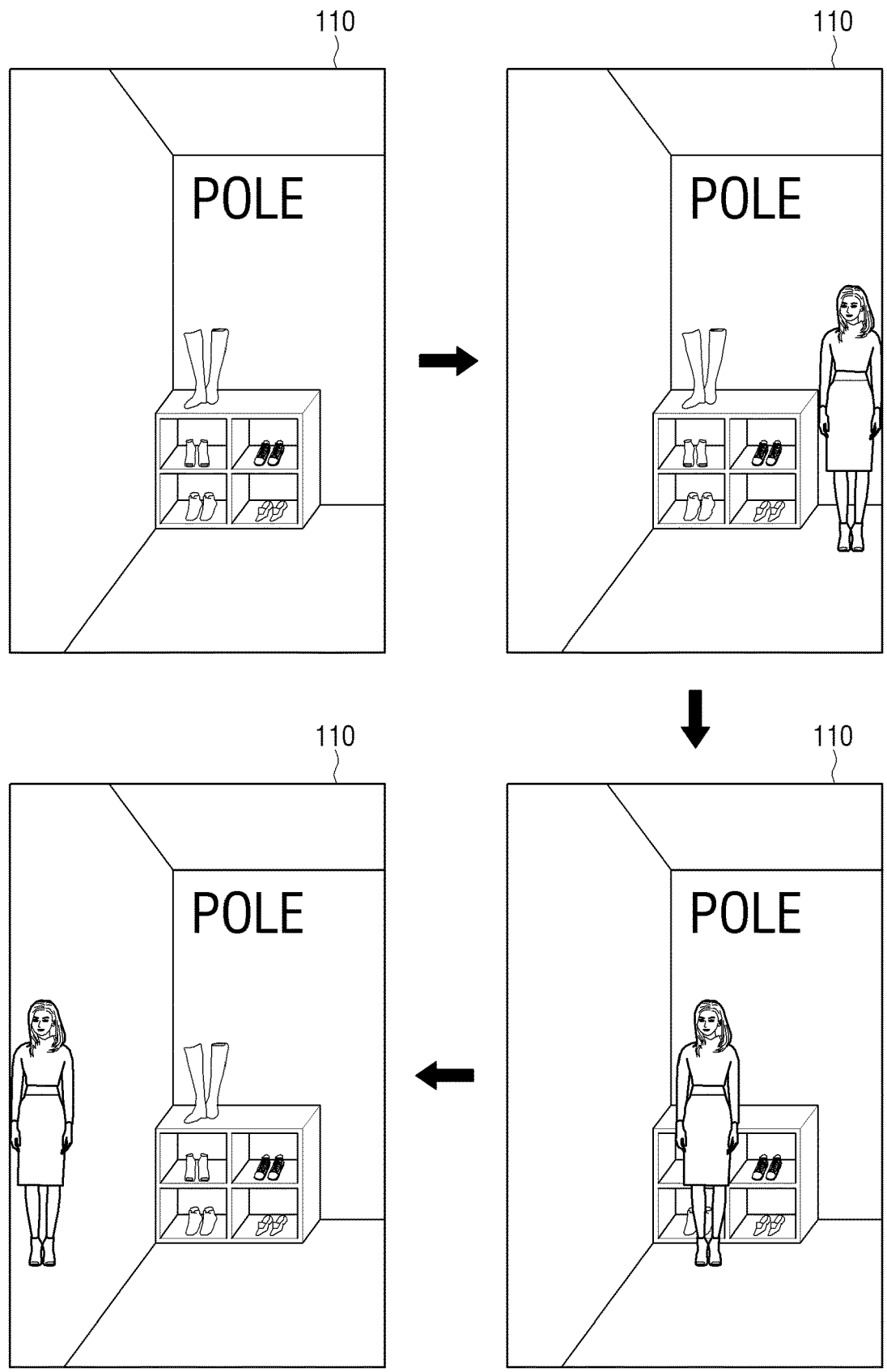

FIGS. 6A to 6C are views to illustrate a display state according to a user's motion according to an exemplary embodiment.

Referring to FIG. 6A, the sensor 120 may recognize a user's motion, and the processor 130 may control a motion state of a clothing model such that the clothing model corresponds to the recognized user's motion. For example, the sensor 120 may recognize the user approaching the display 110, and, in response to the user approaching the display 110, the processor 130 may change the clothing model to approach the user like a mirror image and display the clothing model. However, this should not be considered as limiting, and the processor 130 may simply increase the size of the clothing model in response to the user approaching the display 110. In addition, the processor 130 may change the resolution of the clothing model and the recommended clothes, and display the clothing model and the recommended clothes.

In response to the user approaching the display 110, the processor 130 may change only the clothing model to be magnified or approach. For example, the processor 130 may determine that the user approaches the display 110 and zoom in onto the clothing model. However, this should not be considered as limiting. For example, the processor 130 may magnify both the clothing model and the background image, and display the clothing model and the background image.

In FIG. 6A, the clothing model's posture is the same as that of the user. However, this should not be considered as limiting. For example, the processor 130 may display the clothing model based on only a user's distance, rather than displaying the clothing model in the same state as the user's state by detecting a distance between the display 110 and the user and the user's posture as shown in FIG. 6A.

In addition, in response to the user raising user's right arm, the processor 130 may display the clothing model raising model's left arm. However, this should not be considered as limiting. The processor 130 may not display the clothing model like a mirror image, and may display the clothing model to raise model's right arm in response to the user raising user's right arm. In addition, the processor 130 may display the clothing model to perform a corresponding motion or to be in a corresponding posture, in response to user's various motions, such as shaking user's arms, pointing, walking, jumping, running, folding user's arms, spreading out user's arms, etc., in addition to raising user's arm.

In addition, the processor 130 may freely control clothing model's legs, head, feet, and hands in addition to the clothing model's arms. In particular, the processor 130 may change the recommended clothes that the model is wearing in response to the shape of the clothing model being changed.

In the above-described example, the processor 130 changes the clothing model and the recommended clothes, and displays them. Specifically, the processor 130 may render the clothing model and the recommended clothes to correspond to the user's motion. However, this should not be considered as limiting. The processor 130 may simply display a pre-stored photo. Hereinafter, the rendering and the changing will be regarded as having the same meaning.

Referring to FIG. 6B, the processor 130 may display a background image which is distinguished from the clothing model. In response to a user's motion of moving in the horizontal direction while keeping a perpendicular distance from the LFD apparatus 100 being recognized, the processor 130 may change the background image based on a user's moving direction, and, in response to a user's motion of changing the perpendicular distance from the LFD apparatus 100 being recognized, the processor 130 may maintain the background image. For example, in response to the user moving from left to right and passing by the LFD apparatus 100, the processor 130 may move a display stand 610 displayed on the right of the display 110 to the left of the display 110, and display the display stand 610. However, in response to the user approaching the LFD apparatus 100, the processor 130 may not change the background image.

In FIG. 6B, only the background image is changed for the sake of easy explanation, but this should not be considered as limiting. For example, as described above, the processor 130 may change the clothing model according to a user's motion. In addition, the processor 130 may display the clothing model to move without changing the background image as shown in FIG. 6C. This is performed in the same way as described, and thus a redundant explanation is omitted.

In FIGS. 6A to 6C, in response to only the user's motion of moving in the horizontal direction while keeping the perpendicular distance from the LFD apparatus 10 being recognized, the background image is changed. However, this should not be considered as limiting. For example, in response to the user's motion of changing the perpendicular distance from the LFD apparatus 100 being recognized, the processor 130 may change and display the background image.

Figure 7:
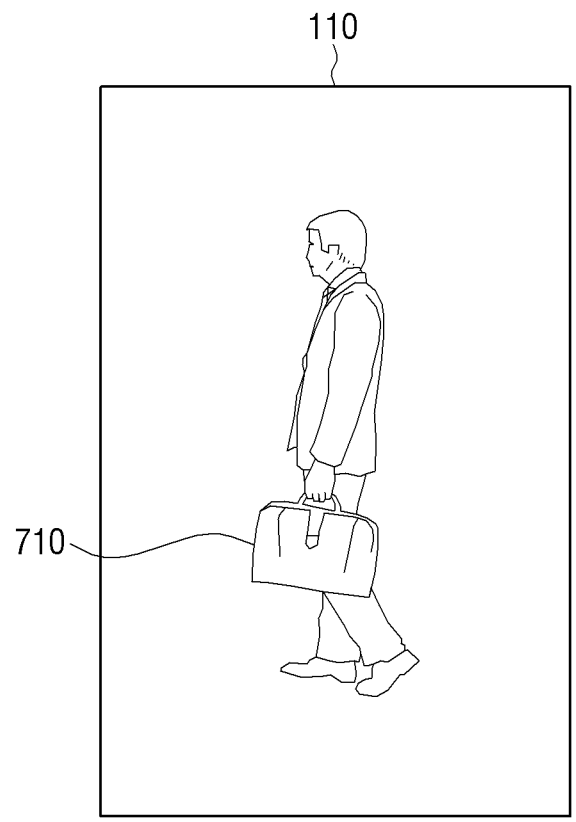
FIG. 7 is a view to illustrate a method for using a user's record of purchase according to an exemplary embodiment.
Figure 7:
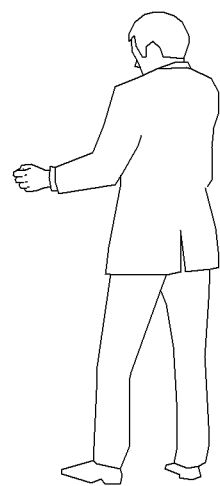

FIG. 7 is a view to illustrate a method of using a user's record of purchase according to an exemplary embodiment.

Referring to FIG. 7, the processor 130 may determine recommended accessories based on at least one of a user's record of having purchased clothes and a record of having purchased accessories, and display a clothing model wearing the recommended accessories. For example, in response to the user having the record of having purchased a bag, the processor 130 may display a clothing model carrying the same bag 710 as the user has purchased. However, this should not be considered as limiting. The processor 130 may display a bag of a follow-up design or a newest bag rather than the bag that the user has purchased. In addition, the processor 130 may display a belt, a watch, a wallet, a scarf, etc. which have been released with the user's bag as a set of accessories.

In addition, the processor 130 may determine the recommended accessories based on a user's record of having purchased clothes. For example, in response to the user having the record of having purchased casual wear, the processor 130 may determine sneakers as the recommended accessories.

Figure 8A:
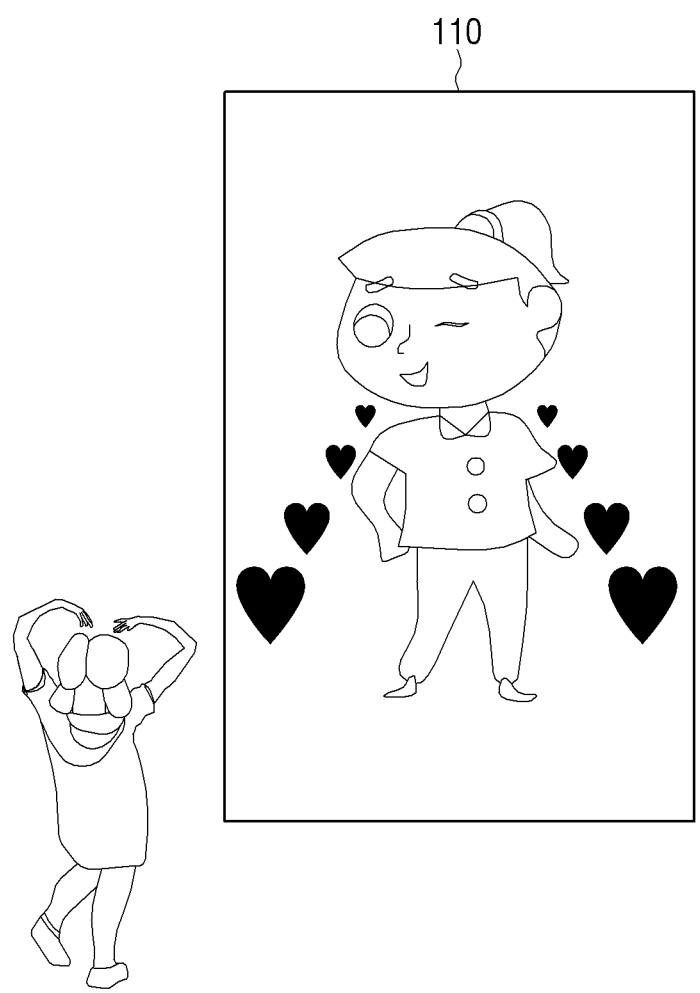
FIGS. 8A and 8B are views to illustrate an animation effect according to an exemplary embodiment.
Figure 8B:
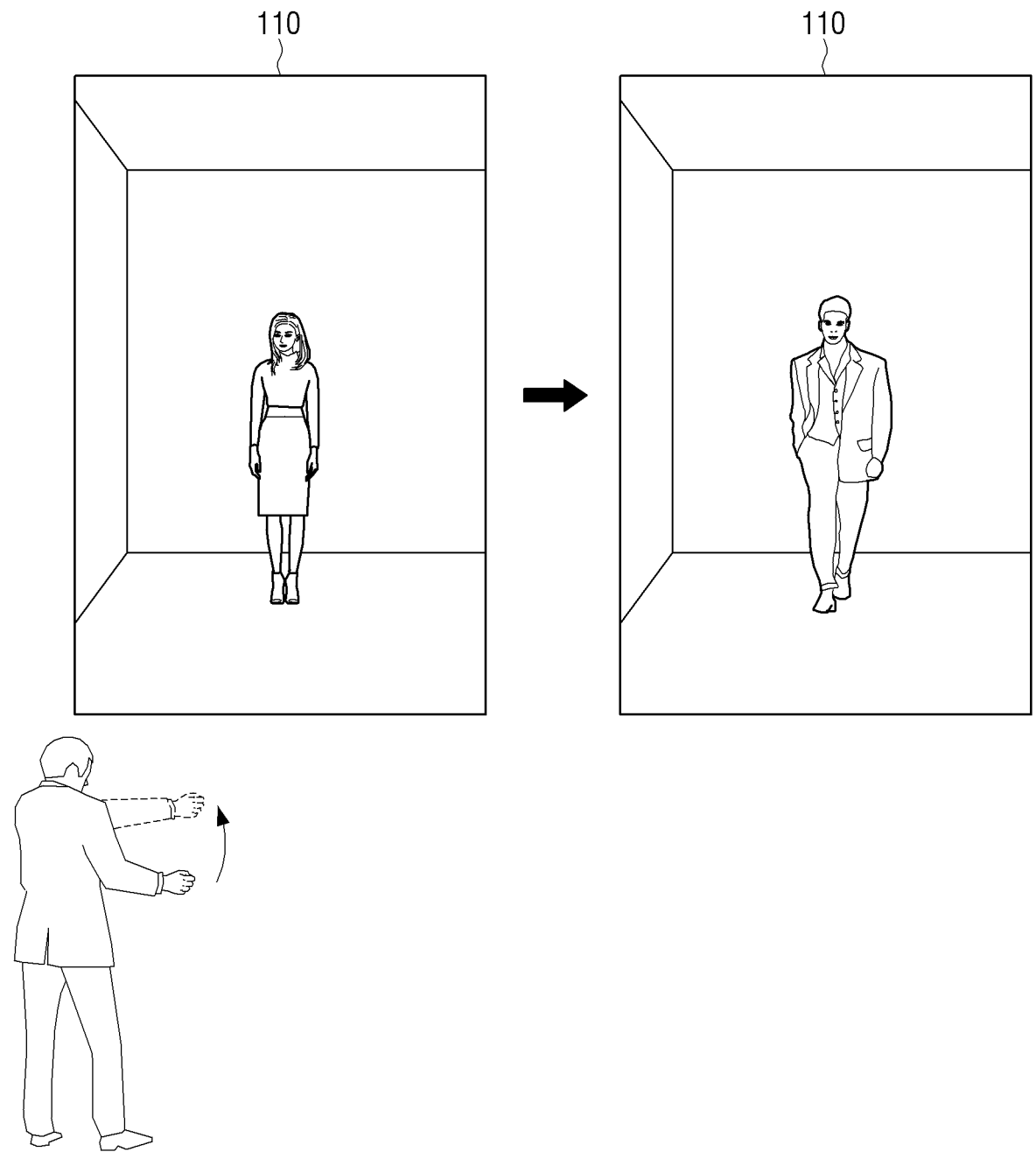

FIGS. 8A and 8B are views to illustrate an animation effect according to an exemplary embodiment.

Referring to FIG. 8A, in response to a user's predetermined operation being recognized, the processor 130 may control a clothing model to make a gesture to react to the predetermined operation, or may display an animation effect corresponding to the predetermined operation. For example, in response to the user making a heart shape with user's both arms, the processor 130 may control the clothing model to make a wink gesture or may display an animation effect of magnifying a heart shape. However, this should not be considered as limiting. The processor 130 may output a voice saying "Thank you!" in response to the user making the heart shape with user's both arms.

Referring to FIG. 8B, in response to a predetermined operation being recognized from the user, the processor 130 may change at least one of a clothing model and recommended clothes. For example, in response to a user's operation of raising user's right arm being recognized, the processor 130 may change the sex of the clothing model. However, this should not be considered as limiting. The processor 130 may change the type of the recommended clothes. In addition, the processor 130 may recognize a user's clapping operation, and change at least one of the clothing model and the recommended clothes.

In the above-described examples, the operation of the processor 130 corresponding to the user's predetermined operation has been described. However, this should not be considered as limiting. For example, the processor 130 may recognize a voice rather than a user's predetermined operation, and perform a corresponding operation.

Figure 9A:
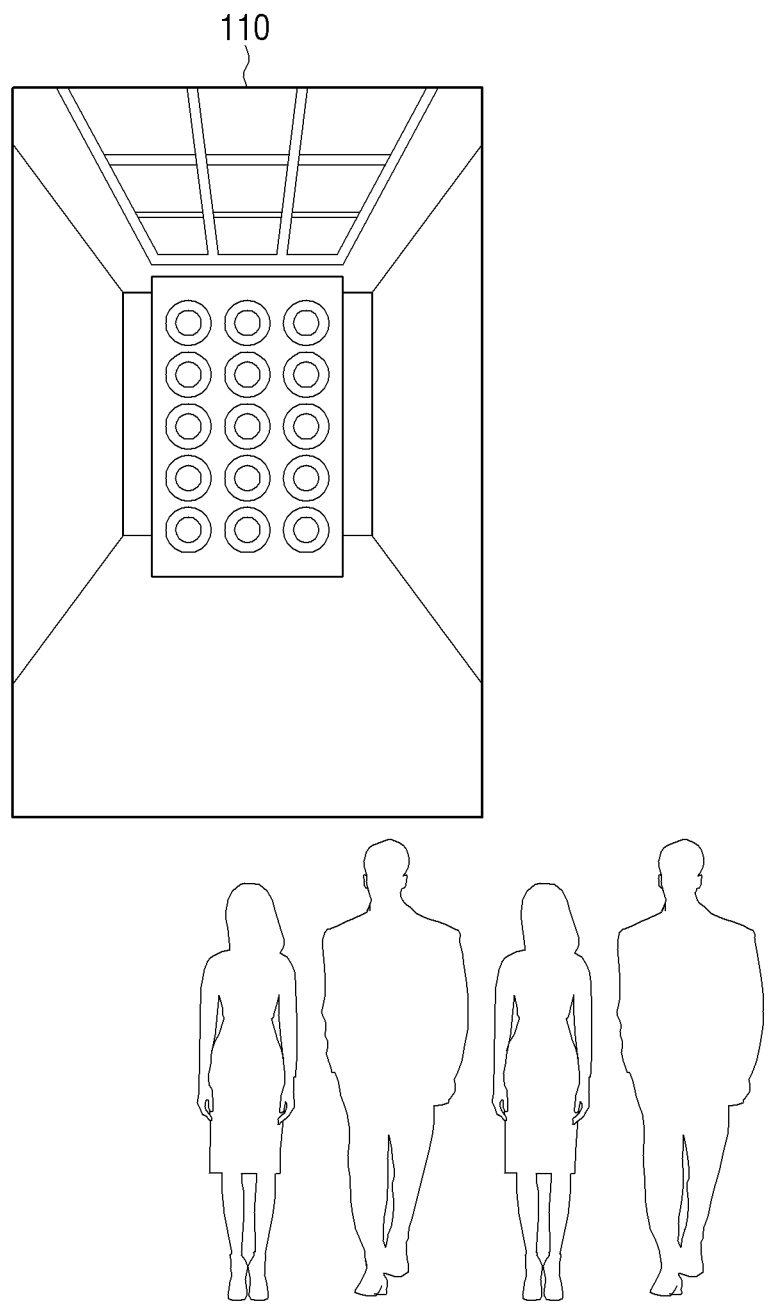
FIGS. 9A to 9C are views to illustrate a case in which a plurality of users are detected according to an exemplary embodiment.
Figure 9B:
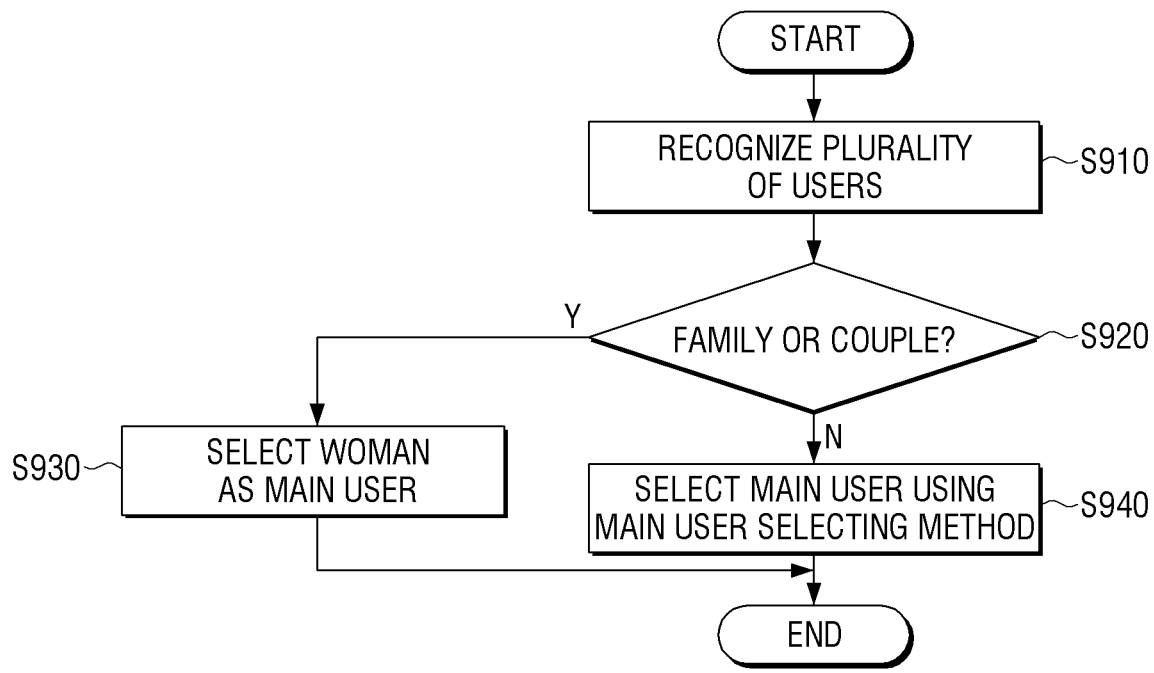
Figure 9C:
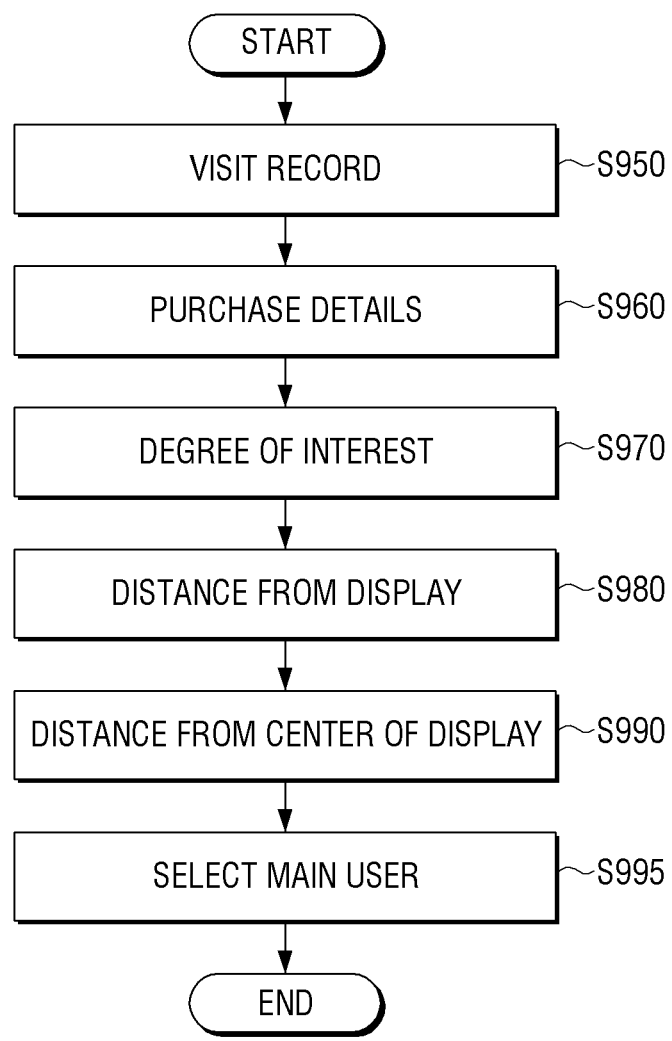

FIGS. 9A to 9C are views to illustrate a case in which a plurality of users are detected according to an exemplary embodiment.

Referring to FIG. 9A, in response to a plurality of users being recognized through the sensor 120, the processor 130 may determine a main user from among the plurality of users based on at least one of a record of visit of the plurality of users, a record of purchase, a degree of interest in the LFD apparatus 100, a distance from the display 110, and a distance from the center of the display 110, and may display a clothing model or a product, an advertisement, etc. corresponding to the main user. For example, the processor 130 may determine the main user with reference to the user having the record of having purchased the most from among the plurality of users. In addition, the processor 130 may determine the main user with reference to the user having the highest degree of interest from among the plurality of users. An operation after the main user is determined is the same as described above.

Herein, the processor 130 may measure the degree of interest in the LFD apparatus 100 based on at least one of a user's face direction and a time during which the user is staring at the display 110. For example, as the user stares at the display 110 for a longer time, it is determined that the degree of interest increases.

FIG. 9B is a flowchart to illustrate a method for determining a main user according to an exemplary embodiment.

First, the processor 130 may recognize a plurality of users through the sensor 120 (operation S910). In response to the plurality of users being recognized, the processor 130 may determine a relationship between the plurality of users, and determine whether the plurality of users are classified into a family or a couple (e.g., an unmarried couple) (operation S920). For example, when one man and one woman are in a predetermined distance from each other or are touching each other, the processor 130 may determine that they are a couple (e.g., an unmarried couple). In addition, in response to a man holding a child in his arms and a woman being detected, the processor 130 may determine that they are a family. In addition, the processor 130 may determine whether the users are a family or not according to similarity of facial characteristics through face recognition.

In response to the plurality of users being determined to be the family or couple, the processor 130 may select the woman as a main user (S930). As described above, the processor 130 may display a clothing model and recommended clothes corresponding to the main user. However, this should not be considered as limiting. The processor 130 may determine the recommended clothes corresponding to the main user and reflecting that the users are the family or the couple. For example, in response to the plurality of users being determined to be the couple, the processor 130 may determine a couple costume from among clothes related to the clothes that the main user is wearing as the recommended clothes. In other words, the processor 130 may determine the main user based on personal relationship among the plurality of users.

In response to the plurality of users being neither the family nor the couple, the processor 130 may select a main user using a main user selecting method (operation S940). The method of selecting a main user at operation S940 will be explained below with reference to FIG. 9C.

Referring to FIG. 9C, the processor 130 may compare the record of visit of the plurality of users and select a user having the record of having frequently visited as the main user (operation S950). The record of visit may be included in the user's profile information. When a user has no record stored, the processor 130 may process the record of visit of the user as "0."

In addition, the processor 130 may use the record of visit that falls within a predetermined period. For example, the processor 130 may select the main user with reference to the record of visit in the past year.

In response to the plurality of users having the same record of visit, the processor 130 may compare purchase details and select a user who has more purchase details as the main user (operation S960). For example, the processor 130 may select the main user based on the number of times of purchasing from among the purchase details. However, this should not be considered as limiting. The processor 130 may select the main user with reference to the total purchase amount from among the purchase details. In addition, the processor 130 may use only the purchase details within a predetermined period.

In response to the plurality of users having the same purchase details, the processor 130 may compare the degree of interest in the LFD apparatus 100 and may select a user having the high degree of interest as the main user (operation S970). The processor 130 may measure the degree of interest in the LFD apparatus 100 based on at least one of a user's face direction and a time during which the user is staring at the display 110.

In response to the plurality of users having the same degree of interest, the processor 130 may compare distances from the display 110, and may select a user having the short distance from the display 110 as the main user (operation S980). In response to the plurality of users having the same distance from the display 110, the processor 130 may compare distances from the center of the display 110, and may select a user having the short distance from the center of the display 110 as the main user (operation S990). Through the above-described process, the processor 130 may select the main user (operation S995).

However, this should not be considered as limiting. The processor 130 may change the order of the record of visit, purchase details, etc., and select the main user. In addition, the processor 130 may select the main user by giving weight to the record of visit, purchase details, etc. Furthermore, the processor 130 may omit one or more of the operations S950, S960, S970, S980, and S990 to select the main user at operation S995. For example, the processor 130 may perform the operation S980 and omit to perform the operations S950, S960, S970, and S990 before selecting the main user at operation S995.

The processor 130 may select a plurality of main users. For example, when there are three clothing models to be displayed by the LFD apparatus 100 simultaneously, the processor 130 may select three main users. The number of clothing models that the LFD apparatus 100 can simultaneously display may be determined by the limit of hardware.

In addition, in response to the plurality of users being recognized, the processor 130 may select a user who is recognized first from among the plurality of users as the main user.

Figure 10:
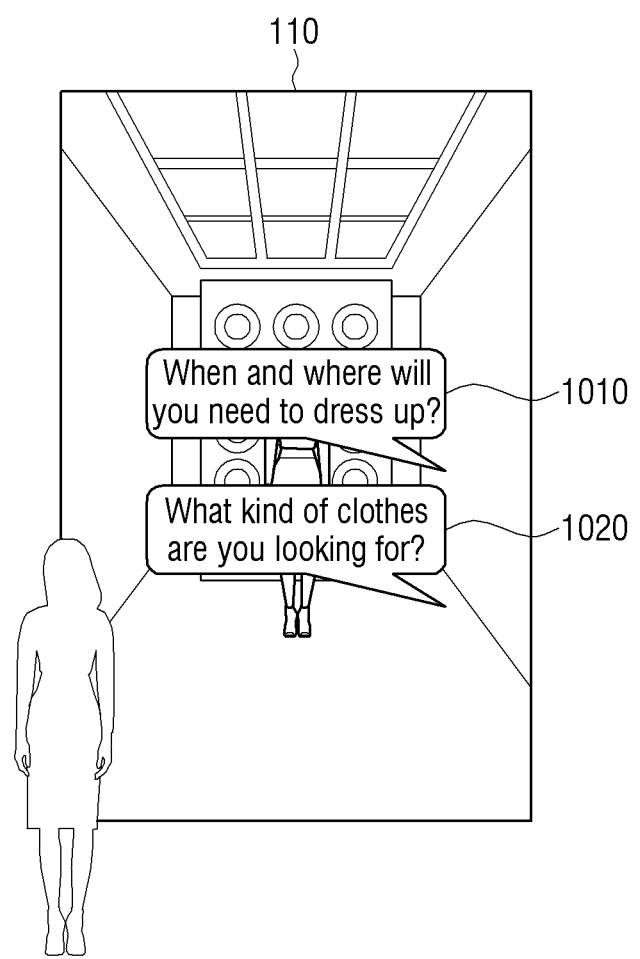
FIG. 10 is a view to illustrate a method for providing a query according to an exemplary embodiment.

FIG. 10 is a view to illustrate a method for providing a query according to an exemplary embodiment.

Referring to FIG. 10, in response to a distance between the display 110 and a user being within a predetermined distance, the processor 130 may provide a query for receiving information on types of clothes the user wants to wear. For example, in response to the distance between the display 110 and the user being within 50 cm, the processor 130 may display a query such as "When and where will you need to dress up?" or "What kind of clothes are you looking for?" However, this should not be considered as limiting, and the processor 130 may provide the query as a voice.

The processor 130 may receive a response of the user to the query as a voice, and may provide a new UI to receive the user's response.

The processor 130 may determine recommended clothes based on the user's response to the query. For example, in response to the user answering that the user wants golf wear, the processor 130 may determine golf wear as recommended clothes.

In addition, the processor 130 may acquire at least one of user's sex, age, clothing attribute, skin tone, body type, fashion image, etc., as user's profile information, and may determine recommended clothes based on the acquired profile information and the user's response. For example, in response to the user's response being a swimsuit and the user being a woman in her twenties, the processor 130 may determine a bikini as recommended clothes, and, in response to the user's response being a swimsuit and the user being a woman in her forties, the processor 130 may determine a normal swimsuit as recommended clothes.

FIGS. 11A to 11E are views to illustrate an operation of an LFD apparatus 100 according to an exemplary embodiment.

Figure 11A:
FIGS. 11A to 11E are views to illustrate an operation of an LFD apparatus according to an exemplary embodiment.

Referring to FIG. 11A, in response to no user being recognized, the processor 130 may display a predetermined advertisement. In FIG. 11A, a clothing model wearing specific clothes is displayed, but is not limited to this. For example, the processor 130 may display a brand name without displaying a clothing model, or may display a TV advertisement.

Figure 11B:
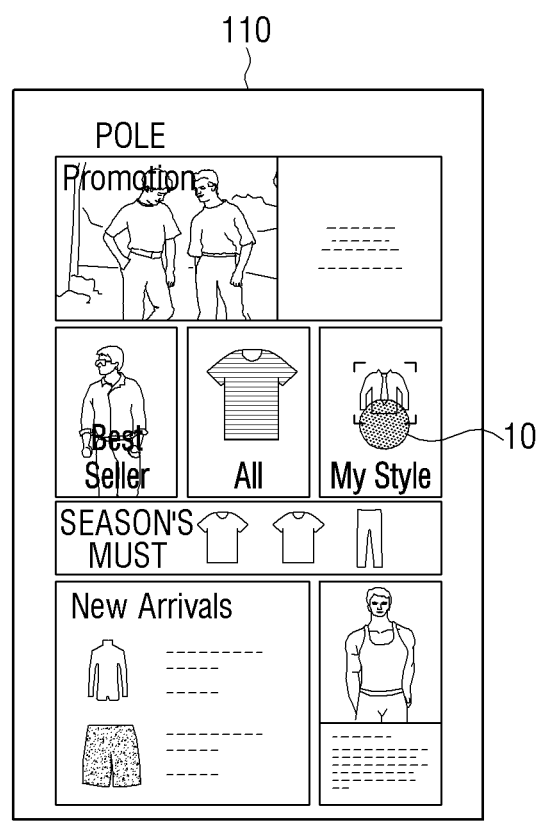

Referring to FIG. 11B, in response to a user's touch operation or a user being detected, the processor 130 may display various menus. In FIG. 11B, a promotion menu, a best seller menu, an all product menu, etc. are displayed, but they are changeable. As described above prior to FIGS. 11A to 11E, the processor 130 may display a clothing model and recommended clothes corresponding to the recognized user.

In FIG. 11B, the processor 130 displays a menu screen rather than displaying a clothing model and recommended clothes corresponding to the recognized user to explain various exemplary embodiments. Herein, to display the clothing model and the recommended clothes corresponding to the recognized user, "My Style" of the menu screen is selected.

Figure 11C:

Referring to FIG. 11C, in response to the user selecting "My Style" of the menu screen, the processor 130 may display a guide screen to recognize the user exactly. However, this should not be considered as limiting. The processor 130 may not display the guide screen and may directly display the clothing model and the recommended clothes corresponding to the recognized user.

Figure 11D:
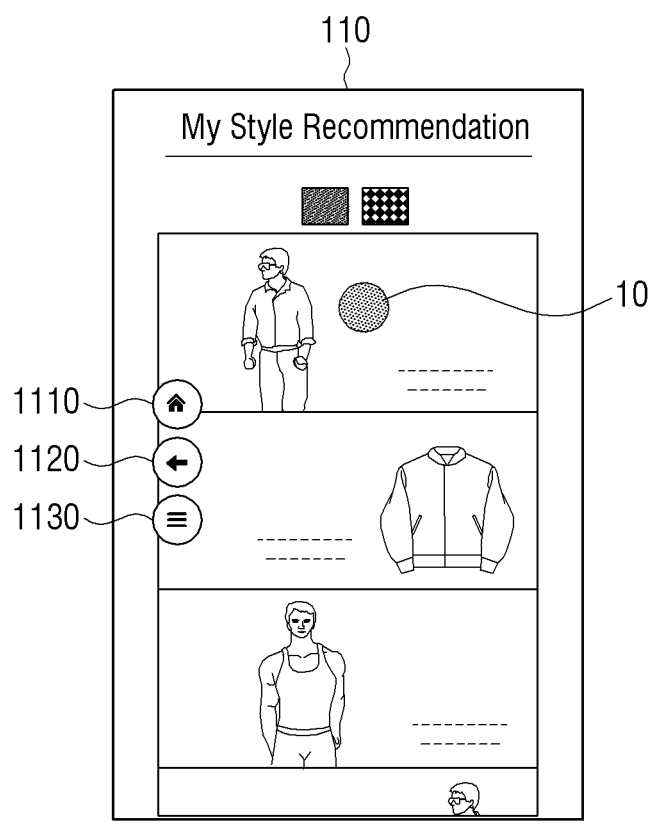

Referring to FIG. 11D, the processor 130 may display the clothing model and the recommended clothes. The processor 130 may display a plurality of recommended clothes. However, this should not be considered as limiting. For example, the processor 130 may determine a single piece of the recommended clothes, and may additionally display clothes or accessories related to the recommended clothes.

In response to the user touching a home button 1110, the processor 130 may display the menu screen. In response to the user touching a previous screen button 1120, the processor 130 may display a previous screen. In addition, in response to the user touching a category button 1130, the processor 130 may display a screen to select a category such as a clothing category, an accessory category, etc. The processor 130 may display the category and a sub category in a pop-up method.

In addition, the processor 130 may display a focus 10. The focus 10 may be displayed by a user's touch, and may be displayed by following the tip of the index finger of the user's right hand. However, this should not be considered as limiting. The LFD apparatus 100 may include a mouse and display the focus 10 of the mouse.

Figure 11E:
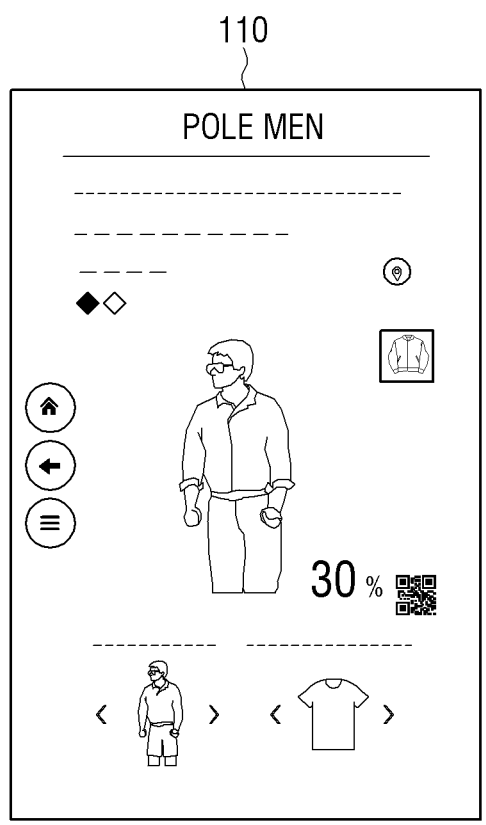

Referring to FIG. 11E, in response to a user input being received to select the first product on the screen of FIG. 11D, the processor 130 may display a screen showing details on the corresponding product. The processor 130 may change the motion of the clothing model wearing the selected clothes according to a user's motion. However, this should not be considered as limiting. When the LFD apparatus 100 is not provided with a means for detecting the user, the processor 130 may display the clothing model wearing the selected clothes, and may not change the motion of the clothing model.

FIGS. 12A to 12E are views to illustrate an operation of an LFD apparatus provided with a mirror display according to an exemplary embodiment.

The mirror display refers to a display which normally operates like a mirror, but uses a predetermined area as a display according to a user's operation. That is, the user may use the mirror display as a mirror or a display for retrieving information.

Figure 12A:
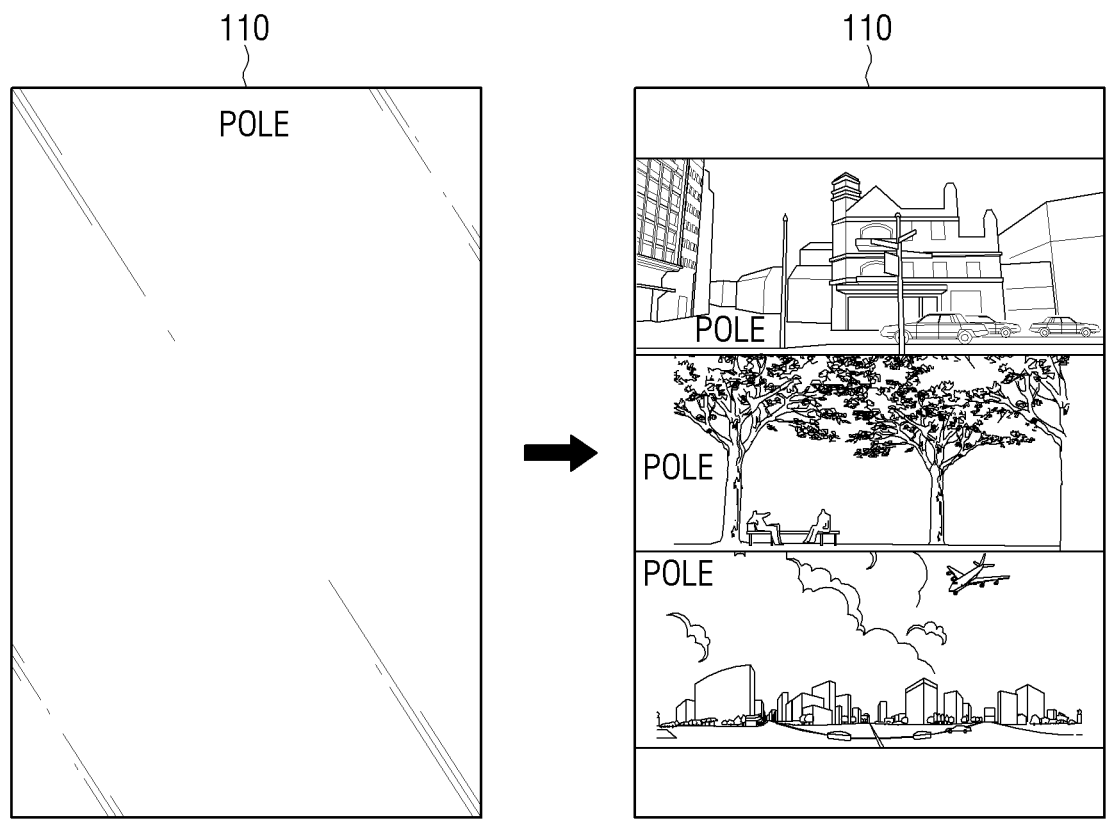
FIGS. 12A to 12E are views to illustrate an operation of an LFD apparatus which is provided with a mirror display according to an exemplary embodiment.

FIG. 12A is a view showing the mirror display in a standby state in which no user is detected. Referring to FIG. 12A, the processor 130 may display a brand name on a certain area of the mirror display, and control the other area to be used as a mirror. In addition, in response to a predetermined time elapsing, the processor 130 may display an advertisement on the mirror display. The processor 130 may display the brand name or display the advertisement at predetermined time intervals.

Figure 12B:
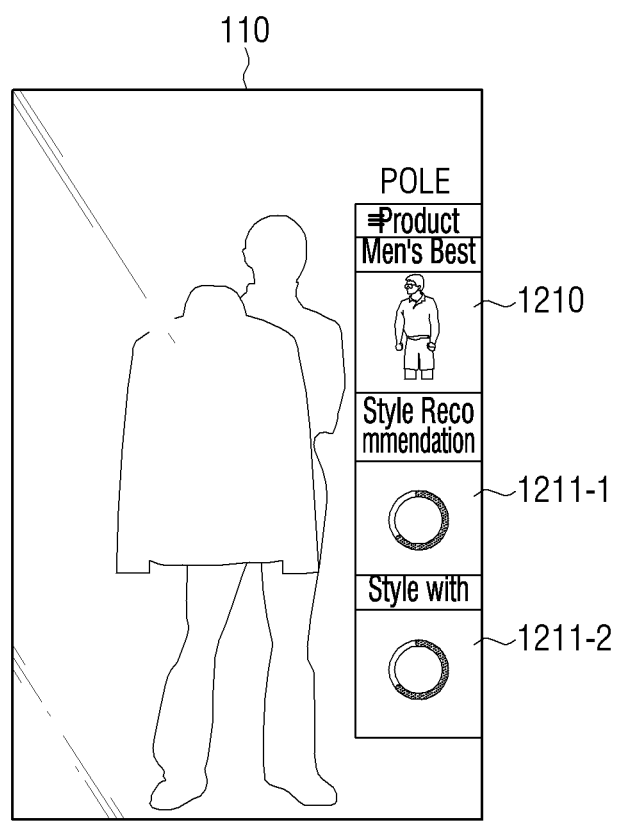

Referring to FIG. 12B, in response to a user being recognized, the processor 130 may display recommended clothes on a certain area of the mirror display, and use the other area as a mirror such that the user is reflected in the mirror display.

The processor 130 may primarily acquire sex, age, etc. from the recognized user, and provide primary recommended clothes 1210. In addition, the processor 130 may acquire color, pattern, category, etc. from the clothes that the user is wearing, and provide secondary recommended clothes 1211-1, 1211-2. A detailed method for selecting recommended clothes has been described, and thus an explanation thereof is omitted.

In FIG. 12B, the primary recommended clothes 1210 and the secondary recommended clothes 1211-1, 1211-2 are displayed at different times, but this is merely an example and the recommended clothes may be displayed simultaneously.

Figure 12C:
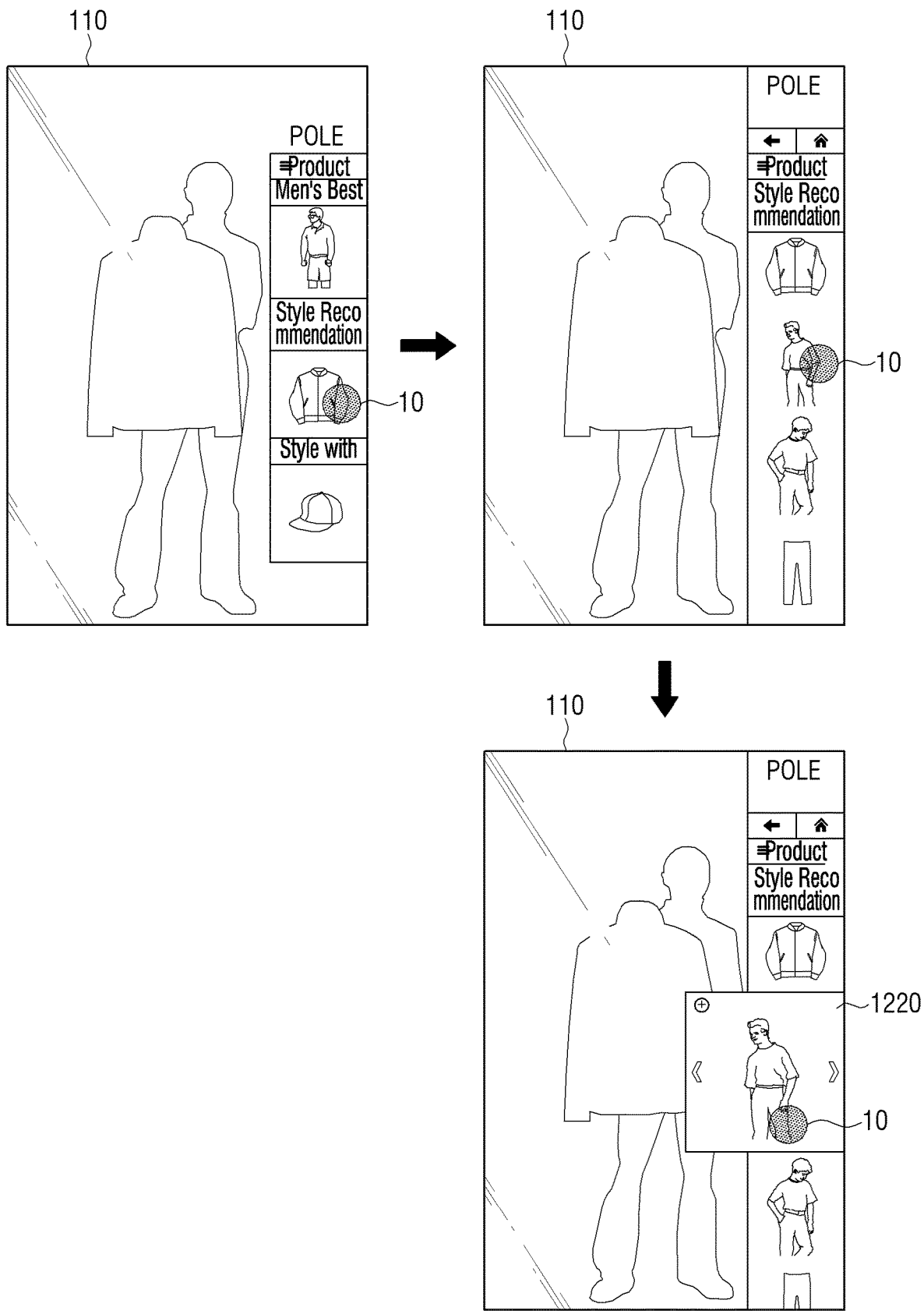

Referring to FIG. 12C, in response to the user selecting one piece of the recommended clothes, the processor 130 may display sub clothes of the selected clothes. For example, the processor 130 may display a top, outer clothing, and a hat as recommended clothes, and, in response to the user selecting the outer clothing, may display a variety of outer clothing as recommended clothes.

In response to the user selecting one piece of the sub clothes, the processor 130 may display the selected sub clothes on a magnified area 1220 to show details. In this case, a part of the area of the mirror display used as a mirror may be reduced.

Figure 12D:
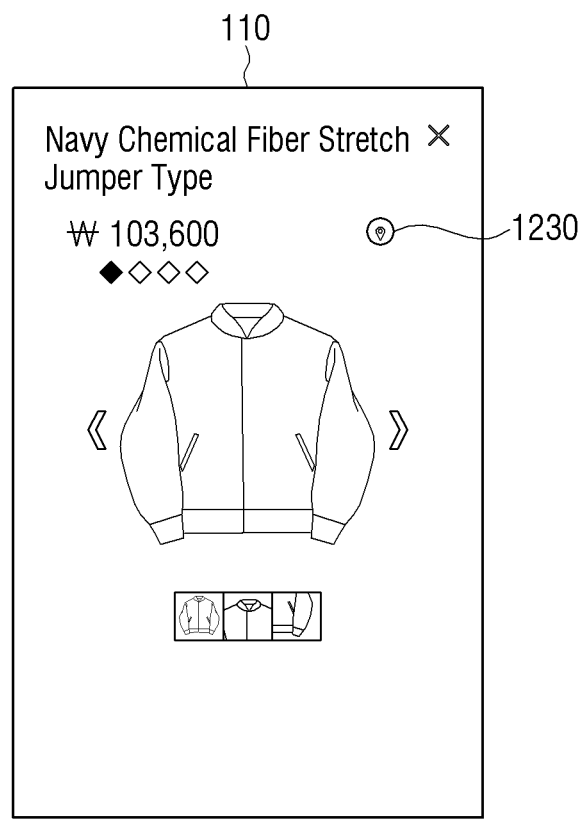

Referring to FIG. 12D, in response to the user touching the magnified area 1220 once more, the processor 130 may display the selected clothes and detailed information thereof on the full screen. In this case, the whole area of the mirror display is used as a display area for providing information, and may not be used as a mirror.

The processor 130 may display a graphic user interface (GUI) 1230 for providing information on a product location. However, this should not be considered as limiting. The processor 130 may display the information on the product location along with the selected clothes.

In FIG. 12D, the product may be displayed in a full screen mode. However, this should not be considered as limiting. For example, the processor 130 may display a clothing model wearing the selected product, and display the clothing model while changing a motion of the clothing model to correspond to a user's motion.

Figure 12E:
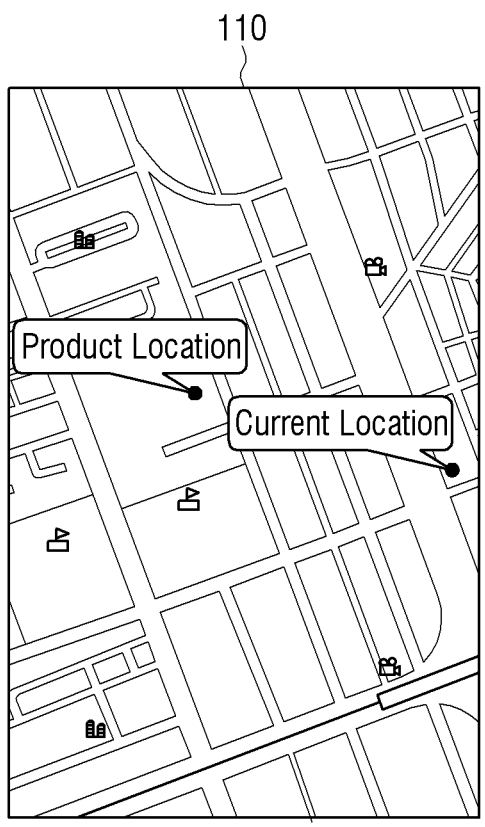

Referring to FIG. 12E, in response to the user touching the GUI 1230 for providing the information on the product location, the processor 130 may display a store map to indicate the product location. The processor 130 may display a current location and the product location on the store map. However, this should not be considered as limiting. The processor 130 may display the store map on the screen of FIG. 12D in a pop-up method, and inform the user of the product location using a voice.

In the above-described examples, the LFD apparatus 100 using a normal display and a mirror display has been described. However, this should not be considered as limiting. For example, the LFD apparatus 100 may include a display wall or a non-glass 3D display. In this case, when the LFD apparatus 100 includes the display wall, the display wall may be established in a triangular or pyramid shape as well as in a rectangular shape.

Figure 13A:
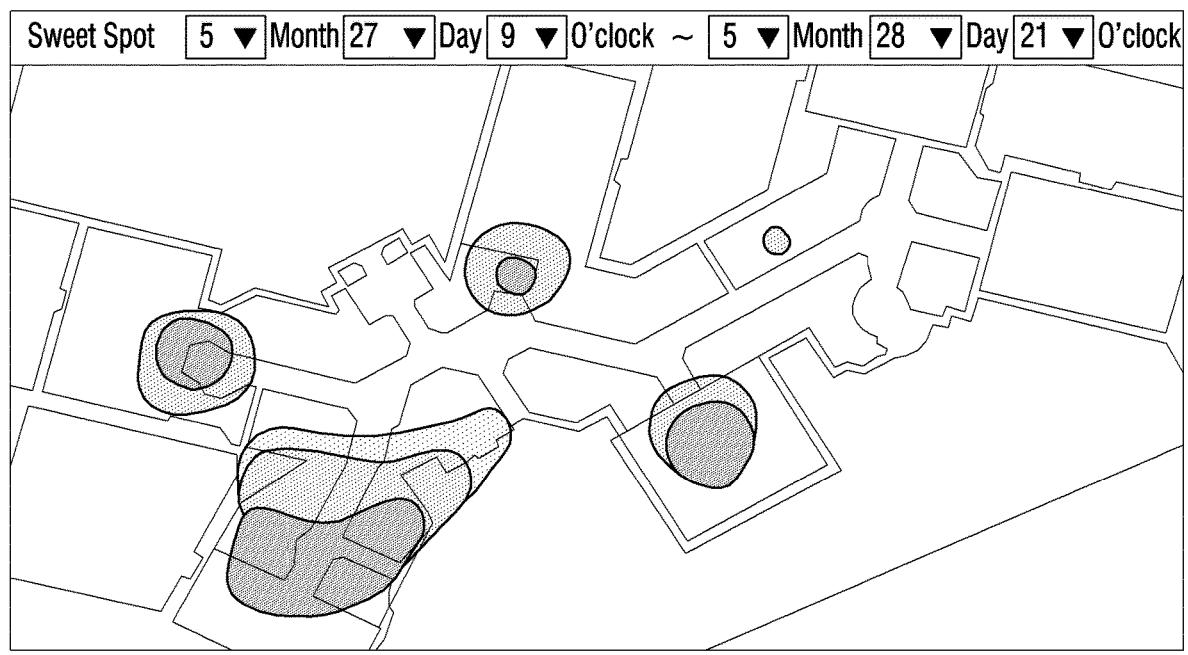
FIGS. 13A to 13C are views to illustrate a method for providing statistical information according to an exemplary embodiment.
Figure 13B:
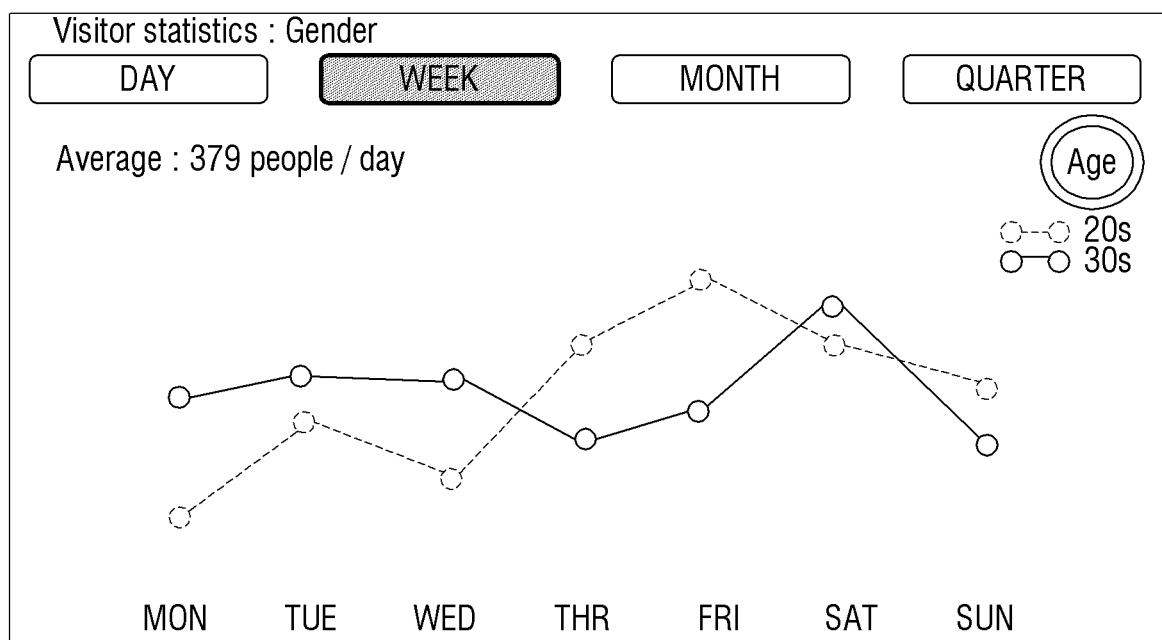
Figure 13C:
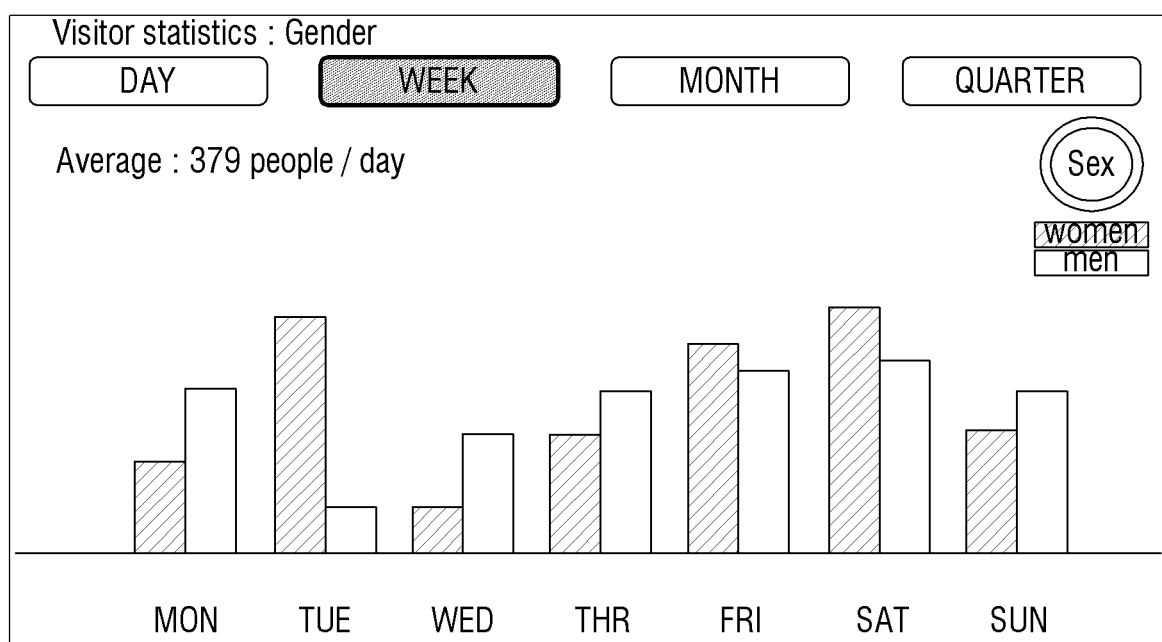

FIGS. 13A to 13C are views to illustrate a method for providing statistical information according to an exemplary embodiment.

Referring to FIG. 13A, the processor 130 may display user's cumulative distribution in a store on the store map. For example, a store ceiling may be provided with a plurality of cameras, and the processor 130 may accumulate data on the traffic line of the plurality of users in the store using the plurality of cameras for one month, and add the accumulated traffic line data to the store map and display the store map. The processor 130 may display a specific point where much data is accumulated in thick color.

Referring to FIG. 13B, the processor 130 may display the number of times the users have been recognized for a week according to age. This may be information on one LFD apparatus 100. However, this should not be considered as limiting. For example, when a plurality of LFD apparatuses 100 are arranged in the store, data may be collected from the plurality of LFD apparatuses 100, and accumulated data may be displayed.

In addition, the processor 130 may select a user who actively uses the LFD apparatus 100 using a touch operation for statistical sampling and display the user.

Referring to FIG. 13C, the processor 130 may provide statistics according to sex of visitors. In FIG. 13C, the statistics are displayed using a bar graph. However, this should not be considered as limiting. The processor 130 may provide information using other types of graphs or numerical values.

Figure 14:
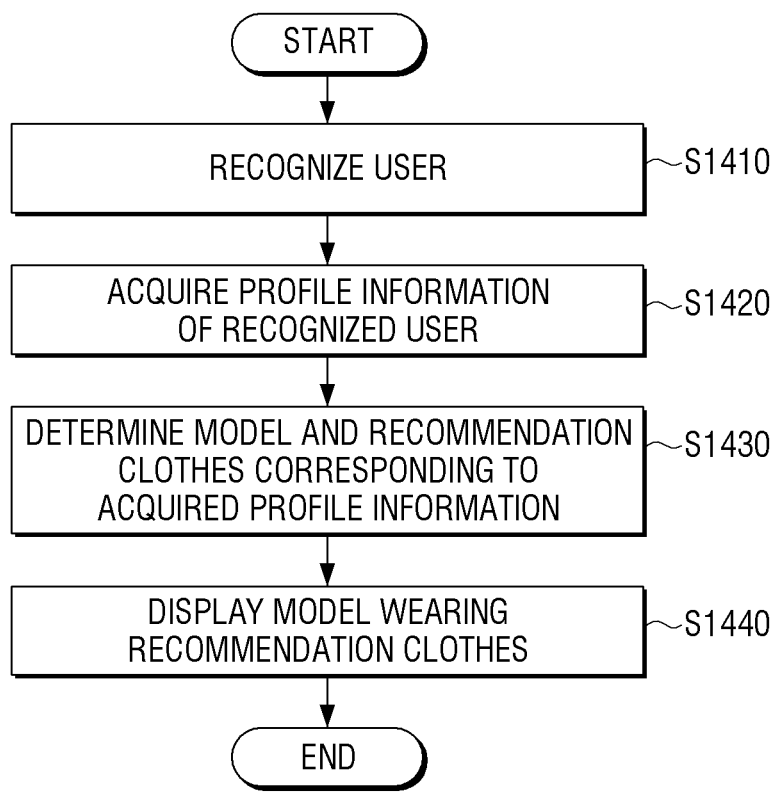
FIG. 14 is a flowchart to illustrate a control method of an LFD apparatus according to an exemplary embodiment.

FIG. 14 is a flowchart to illustrate a control method of an LFD apparatus according to an exemplary embodiment.

First, the LFD apparatus recognizes a user (operation S1410). The LFD apparatus acquires profile information of the recognized user (operation S1420). In addition, the LFD apparatus determines a clothing model and recommended clothes corresponding to the acquired profile information (operation S1430). In addition, the LFD apparatus displays the clothing model wearing the recommended clothes (operation S1440).

The operation of recognizing (operation S1410) may include recognizing a motion of the user, and the operation of displaying (operation S1440) may include controlling a motion state of the clothing model such that the clothing model corresponds to the recognized motion of the user.

In addition, the operation of displaying (operation S1440) may include displaying a background image which is distinguished from the clothing model, and, in response to a user's motion of moving in a horizontal direction while keeping a perpendicular distance from the LFD apparatus being recognized, changing the background image based on a moving direction of the user, and, in response to a user's motion of changing the perpendicular distance from the LFD apparatus being recognized, maintaining the background image.

In addition, the operation of determining (operation S1430) may include determining the clothing model based on age and sex information of the user, and determining the recommended clothes based on information on clothes that the user is wearing.

In addition, the operation of determining (operation S1430) may include determining recommended accessories based on at least one of a record of purchase of clothes of the user, and a record of purchase of accessories, and the operation of displaying (operation S1440) may include displaying the clothing model wearing the recommended accessories.

In addition, the control method may further include, in response to a distance between the display and the user being within a predetermined distance, providing a query for receiving a type of clothes that the user wants, and the operation of determining (operation S1430) may include determining the recommended clothes based on a user's response to the query.

In addition, the operation of acquiring (operation S1420) may include acquiring at least one of a sex, an age, a clothing attribute, a skin tone, a body type, and a fashion image of the user as the profile information of the user, and the operation of determining (operation S1430) may include determining the recommended clothes based on the acquired profile information and the user's response.

In addition, the operation of displaying (operation S1440) may include, in response to a predetermined operation being recognized from the user, controlling the clothing model to make a gesture to react to the predetermined operation, and displaying an animation effect corresponding to the predetermined operation.

In addition, the control method may further include, in response to a plurality of users being recognized, determining a main user from among the plurality of users based on at least one of a record of visit of the plurality of users, a record of purchase, a degree of interest in the LFD apparatus, a distance from the display, and a distance from a center of the display, and the operation of displaying (operation S1440) may include displaying the clothing model corresponding to the main user.

In addition, the operation of determining the main user may include measuring the degree of interest in the LFD apparatus based on at least one of a face direction of the user and a time during which the user is staring at the display.

According to various exemplary embodiments described above, the LFD apparatus may arouse user's interest by displaying a clothing model and recommended clothes corresponding to user's profile information, and may allow the user to easily purchase the clothes as the user desires by providing various recommended clothes, so that user convenience may be enhanced.

In the above-described exemplary embodiments, the LFD apparatus stores CRM information. However, this should not be considered as limiting. For example, the LFD apparatus may transmit information on the recognized user to a server, and may receive designation of a clothing model and recommended clothes from the server.

The control method of the LFD apparatus according to various exemplary embodiments described above may be implemented as a program code which can be executed in a computer, and may be stored in various non-transitory computer readable media and provided to servers or devices to be executed by a processor.

For example, a non-transitory computer readable medium which stores a program serially performing the operations of: recognizing a user; acquiring profile information of the recognized user; determining a clothing model and recommended clothes corresponding to the acquired profile information; and displaying the clothing model wearing the recommended clothes, may be provided.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:
1. A display apparatus comprising:
a display;
a camera; and
a processor configured to:
control the camera to capture a user that is present within a predetermined distance from the display;

acquire profile information of the user based on an image obtained by capturing the user;

select a virtual human model from a plurality of virtual human models, based on a gender corresponding to a purchase history of the user included in the profile information of the user;

identify clothes for recommendation based on the profile information; and control the display to display the virtual human model wearing the clothes, wherein the gender corresponding to the purchase history of the user is the gender assigned to previously purchased clothes that were purchased by the user more than a predetermined number in a predetermined past time period.

2. The display apparatus of claim 1, wherein the processor is configured to display a background image which is distinguished from the virtual human model, and wherein, in response to a motion of the user of moving in a horizontal direction while keeping a perpendicular distance from the display apparatus being recognized, the processor is configured to change the background image based on a moving direction of the user, and, in response to the motion of the user of changing the perpendicular distance from the display apparatus being recognized, the processor is configured to maintain the background image.

3. The display apparatus of claim 1, wherein the processor is further configured to increase a size of the virtual human model in response to the user approaching the display.

4. The display apparatus of claim 1, wherein the processor is configured to identify recommended accessories based on at least one of a record of purchase of the previously purchased clothes of the user, and a record of purchase of accessories, and display the virtual human model wearing the recommended accessories.

5. The display apparatus of claim 1, wherein, in response to a distance between the display and the user being within the predetermined distance, the processor is configured to generate a query that inquires about a type of preferred clothes that the user wants to wear, control to display the query to be laid over the virtual human model, and identify the clothes based on a response of the user to the query.

6. The display apparatus of claim 1, wherein the processor is further configured to acquire information of a skin tone of the user as the profile information of the user, and identify the clothes for recommendation based on the acquired profile information comprising the information of the skin tone of the user.

7. The display apparatus of claim 1, wherein, in response to a predetermined operation being recognized from the user, the processor is configured to control the virtual human model to make a gesture to react to the predetermined operation, and display an animation effect corresponding to the predetermined operation.

8. The display apparatus of claim 1, wherein the processor is configured to identify the user as a main user from among a plurality of users recognized through the camera, based on respective face directions of the plurality of users.

9. The display apparatus of claim 8, wherein the processor is configured to identify the user as the main user from among the plurality of users based on respective time durations during which the plurality of users is staring at the display.

10. A control method of a display apparatus, the control method comprising:

capturing a user that is present within a predetermined distance from the display apparatus;

acquiring profile information of the user based on an image obtained by capturing the user;

selecting a virtual human model from a plurality of virtual human models, based on a gender corresponding to a purchase history of the user included in the profile information of the user;

identifying clothes for recommendation based on the profile information; and displaying the virtual human model wearing the clothes, wherein the gender corresponding to the purchase history of the user is the gender assigned to previously purchased clothes that were purchased by the user more than a predetermined number in a predetermined past time period.

11. The control method of claim 10, wherein the displaying comprises displaying a background image which is distinguished from the virtual human model, and wherein the displaying comprises, in response to a motion of the user of moving in a horizontal direction while keeping a perpendicular distance from the display apparatus being recognized, changing the background image based on a moving direction of the user, and, in response to the motion of the user of changing the perpendicular distance from the display apparatus being recognized, maintaining the background image.

12. The control method of claim 10, further comprising increasing a size of the virtual human model in response to the user approaching the display apparatus.

13. The control method of claim 10, wherein the identifying comprises identifying recommended accessories based on at least one of a record of purchase of the previously purchased clothes of the user, and a record of purchase of accessories, and wherein the displaying comprises displaying the virtual human model wearing the recommended accessories.

14. The control method of claim 10, further comprising, in response to a distance between a display and the user being within the predetermined distance, generating a query that inquires about a type of preferred clothes that the user wants to wear and displaying the query to be laid over the displayed virtual human model, and wherein the identifying comprises identifying the clothes for recommendation based on a response of the user to the query.

15. The control method of claim 10, wherein the acquiring comprises acquiring information of a skin tone of the user as the profile information of the user, and wherein the identifying comprises identifying the clothes for recommendation based on the acquired profile information comprising the information of the skin tone of the user.

16. The control method of claim 10, wherein the displaying comprises, in response to a predetermined operation being recognized from the user, controlling the virtual human model to make a gesture to react to the predetermined operation, and displaying an animation effect corresponding to the predetermined operation.

17. The display apparatus of claim 1, wherein the processor is configured to identify the user as a main user from among a plurality of users recognized through the camera, based on respective distances from a center of the display to the plurality of users.

18. A display apparatus comprising:
a display;
a camera; and a processor configured to:
control the camera to capture a user that is present within a predetermined distance from the display;
acquire profile information of the user based on an image obtained by capturing the user;
select a virtual human model from a plurality of virtual human models, based on a purchase history of the user included in the profile information of the user;
identify clothes for recommendation based on the profile information; and
control the display to display the virtual human model wearing the clothes,
wherein the processor is further configured to change the clothes in response to a time period during which the user does not look at the display being greater than a predetermined time.

19. The display apparatus of claim 1, wherein:
the profile information comprises information of a gender of the user, and
the processor is further configured to, based on the gender of the user in the profile information being different from the gender corresponding to the purchase history of the user, select the virtual human model based on the gender corresponding to the purchase history of the user.

* * * * *